(12) United States Patent
Bhandari et al.

(10) Patent No.: US 8,954,342 B2
(45) Date of Patent: Feb. 10, 2015

(54) PUBLISHING AN INDUSTRY BUSINESS ARCHITECTURE MODEL

(75) Inventors: Muthulakshmi Bhandari, Bangalore (IN); Allison Baines Botros, Independence, OH (US); Raman Harishankar, Blacklick, OH (US); Ashish Mungi, Bangalore (IN); Siddharth N. Purohit, Allen, TX (US); Jorge L. C. Sanz, Carmel, CA (US); Aditya Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 12/945,319

(22) Filed: Nov. 12, 2010

(65) Prior Publication Data

US 2012/0124104 A1  May 17, 2012

(51) Int. Cl.
G06Q 10/00 (2012.01)
G06Q 10/06 (2012.01)
G06Q 30/02 (2012.01)
G06F 9/44 (2006.01)

(52) U.S. Cl.
CPC .......... *G06Q 10/067* (2013.01); *G06Q 30/0201* (2013.01); *G06F 8/10* (2013.01); *G06Q 10/063* (2013.01)
USPC ......... 705/7.29; 705/7.22; 705/7.11; 717/103

(58) Field of Classification Search
None
See application file for complete search history.

(56) References Cited

U.S. PATENT DOCUMENTS

| | | | |
|---|---|---|---|
| 5,745,878 A | 4/1998 | Hashimoto et al. | |
| 5,799,286 A | 8/1998 | Morgan et al. | |
| 6,363,393 B1 * | 3/2002 | Ribitzky | 1/1 |
| 6,442,557 B1 | 8/2002 | Buteau et al. | |
| 6,601,233 B1 | 7/2003 | Underwood | |
| 6,965,868 B1 | 11/2005 | Bednarek | |
| 7,120,643 B2 | 10/2006 | Dill | |
| 7,239,985 B1 | 7/2007 | Hysom et al. | |
| 7,349,877 B2 | 3/2008 | Ballow et al. | |
| 7,398,240 B2 | 7/2008 | Ballow et al. | |
| 7,516,155 B2 | 4/2009 | Ivan et al. | |
| 8,032,404 B2 | 10/2011 | Lee et al. | |
| 8,160,920 B2 * | 4/2012 | Gerke et al. | 705/7.36 |
| 8,543,447 B2 * | 9/2013 | Corneil et al. | 705/7.36 |

(Continued)

FOREIGN PATENT DOCUMENTS

| | | |
|---|---|---|
| CN | 1787437 A | 6/2006 |
| CN | 1860466 A | 11/2006 |

(Continued)

OTHER PUBLICATIONS

Cherbakov, Luba, et al. "Impact of service orientation at the business level." IBM Systems Journal 44.4 (2005): 653-668.* van Diessen, Raymond J., Barbara Sierman, and Christopher A. Lee. "Component business model for digital repositories: A framework for analysis."Proc. iPRES 2008 (2008).*

Melcher, Joachim, and Detlef Seese. "Visualization and clustering of business process collections based on process metric values." Symbolic and Numeric Algorithms for Scientific Computing, 2008. SYNASC'08. 10th International Symposium on. IEEE, 2008.*

(Continued)

*Primary Examiner* — Gurkanwaljit Singh
(74) *Attorney, Agent, or Firm* — Whitham, Curtis, Christofferson & Cook, P C; John R Pivnachy

(57) ABSTRACT

A data-driven mechanism of business rules is used to form associations between business sectors, industries, solutions, solution offerings, and industry business architecture models. The system and method includes use of a navigation hierarchy, and entity diagram to facilitate use by business consultants for access, viewing, navigation, publishing, and updating.

11 Claims, 18 Drawing Sheets

(56) References Cited

U.S. PATENT DOCUMENTS

| | | | |
|---|---|---|---|
| 2001/0049615 | A1 | 12/2001 | Wong et al. |
| 2002/0026630 | A1* | 2/2002 | Schmidt et al. ............... 717/103 |
| 2002/0128895 | A1 | 9/2002 | Broderick et al. |
| 2002/0165757 | A1 | 11/2002 | Lisser |
| 2002/0169658 | A1 | 11/2002 | Adler |
| 2002/0194053 | A1 | 12/2002 | Barrett et al. |
| 2002/0198727 | A1* | 12/2002 | Ann et al. ......................... 705/1 |
| 2003/0004746 | A1 | 1/2003 | Kheirolomoom et al. |
| 2003/0018504 | A1 | 1/2003 | Yamada et al. |
| 2003/0074240 | A1 | 4/2003 | Kaiser et al. |
| 2003/0084127 | A1 | 5/2003 | Budhiraja et al. |
| 2003/0105655 | A1 | 6/2003 | Kimbrel et al. |
| 2003/0135399 | A1 | 7/2003 | Ahamparam et al. |
| 2003/0167198 | A1 | 9/2003 | Northcott et al. |
| 2004/0078378 | A1 | 4/2004 | Bala |
| 2004/0098392 | A1 | 5/2004 | Dill |
| 2004/0117234 | A1 | 6/2004 | Lindsay-Scott et al. |
| 2004/0143470 | A1* | 7/2004 | Myrick et al. ..................... 705/7 |
| 2004/0162748 | A1 | 8/2004 | Vogel et al. |
| 2004/0162749 | A1 | 8/2004 | Vogel et al. |
| 2004/0162753 | A1 | 8/2004 | Vogel et al. |
| 2004/0167862 | A1* | 8/2004 | Yabloko .......................... 706/55 |
| 2005/0005261 | A1 | 1/2005 | Severin |
| 2005/0091093 | A1 | 4/2005 | Bhaskaran et al. |
| 2005/0119905 | A1* | 6/2005 | Wong et al. ....................... 705/1 |
| 2005/0203784 | A1 | 9/2005 | Rackham |
| 2005/0246215 | A1 | 11/2005 | Rackham |
| 2006/0149560 | A1* | 7/2006 | Podhajsky et al. ................ 705/1 |
| 2006/0224425 | A1* | 10/2006 | Homann et al. .................. 705/7 |
| 2006/0235733 | A1 | 10/2006 | Marks |
| 2007/0022410 | A1* | 1/2007 | Ban et al. ...................... 717/136 |
| 2007/0106520 | A1 | 5/2007 | Akkiraju et al. |
| 2007/0156657 | A1 | 7/2007 | Bredin et al. |
| 2007/0271277 | A1 | 11/2007 | Ivan et al. |
| 2007/0279416 | A1 | 12/2007 | Cobb et al. |
| 2008/0027784 | A1 | 1/2008 | Ang et al. |
| 2008/0126147 | A1 | 5/2008 | Ang et al. |
| 2008/0172273 | A1 | 7/2008 | Rackham |
| 2008/0177622 | A1 | 7/2008 | Akkiraju et al. |
| 2008/0215398 | A1 | 9/2008 | Cohn et al. |
| 2008/0215400 | A1* | 9/2008 | Ban et al. .......................... 705/7 |
| 2008/0312979 | A1 | 12/2008 | Lee et al. |
| 2008/0313110 | A1 | 12/2008 | Kreamer et al. |
| 2009/0037373 | A1 | 2/2009 | Gilbert |
| 2009/0064087 | A1* | 3/2009 | Isom ............................. 717/101 |
| 2009/0143128 | A1* | 6/2009 | Cautley et al. .................. 463/17 |
| 2009/0192867 | A1 | 7/2009 | Farooq et al. |
| 2009/0198534 | A1 | 8/2009 | Brown et al. |
| 2009/0198550 | A1* | 8/2009 | Brown et al. ...................... 705/9 |
| 2010/0036699 | A1* | 2/2010 | Merrifield et al. ............... 705/8 |
| 2010/0082381 | A1* | 4/2010 | Merrifield et al. ............... 705/7 |
| 2010/0318395 | A1* | 12/2010 | Corneil et al. .................... 705/8 |

FOREIGN PATENT DOCUMENTS

| | | |
|---|---|---|
| CN | 101056187 A | 10/2007 |
| CN | 101212304 A | 7/2008 |
| CN | 101222490 A | 7/2008 |
| CN | 101834889 A | 9/2010 |
| CN | 201639604 U | 11/2010 |
| WO | 2004040409 A2 | 5/2004 |

OTHER PUBLICATIONS

Lee, Juhnyoung, and A-A. Ivan. "Value-Centric, Model-Driven Business Transformation." E-Commerce Technology, 2006. The 8th IEEE International Conference on and Enterprise Computing, E-Commerce, and E-Services, the 3rd IEEE International Conference on. IEEE, 2006.*

Nayak, Nitin, et al. "Core business architecture for a service-oriented enterprise." IBM Systems Journal 46.4 (2007): 723-742.*

Lee, Juhnyoung, et al. "Business transformation workbench: A practitioner's tool for business transformation." Services Computing, 2008. SCC'08. IEEE International Conference on. vol. 2. IEEE, 2008.*

Keller, Wolfgang. "Using capabilities in enterprise architecture management."White Paper, Object Architects (2009).*

Corea et al.; "Challenges in business performance measurement: the case of a corporate IT function"; Proc. 5th Int. Conf. BPM 2007. vol. 4714, pp. 16-31, Spring-Verglag, Sep. 2007. Abstract Only.

"Integrated Method and System for Managing Software Components Development"; IP.com Journal. IPCOM/000021976D, Feb. 18, 2004.

Balthazard et al.; "Expertise, Extraversion and Group Interaction Styles as Performance Indicators in Virtual Teams"; the Database for Advances in Information Systems; vol. 35, No. 1, pp. 41-64; 2004.

Fraser et al.; "A Formal Specifications Maturity Model"; ACM Digital Library; pp. 95-105; vol. 40, No. 12, Dec. 1997.

List et al.; "Towards a Corporate Performance Measurement System"; ACM Digital Library; pp. 1344-1354; SAC'04, Mar. 2004.

Goldschmidt et al.; "A Case Study Evaluation of Maintainability and Performance of Persistency Techniques"; ACM; ICSE'08, pp. 401-415, May 10-18, 2008.

Lee et al.; "Value-Centric, Model-Driven Business Transformation"; IEEE Computer Society, Proc. of the 8th IEEE Int. Conf. on E-Commerce Technology and the 3rd IEEE Int. Conf. on Enterprise Computing, E-Commerce, and E-Services, 2006.

"Platform-Independent MetaModel for Business Service Management," Ip.com Journal, IPCOM 000184250D, Jun. 17, 2009.

"Enterprise Architecture Development and Usage Process," IP.com Journal, IPCOM 000145734D, Jan. 24, 2007.

Huner et al.; "Towards a Maturity Model for Corporate Data Quality Management," Proc. SAC'09, Mar. 8, 2009, Honolulu, Hawaii, pp. 231-238.

Renken, "Developing an IS/ICT Management Capability Maturity Framework," Proc. SAICSIT 2004, pp. 53-62.

Kim, Kangtae, "A Case Study on Architectural Maturity Evaluation: Experience in the Consumer Electronics Domain," AN-10337602, 2008.

Glissman and Sanz, "A Comparative Review of Business Architecture," IBM Research Report RJ 10451, Aug. 24, 2009.

Freeland, The Ultimate CRM Handbook, McGraw Hill, New York, 2003, Chapter 1, pp. 3-9.

Enterprise Agility, Inc. Business Maturity Models (BAMM). 2009. http://www.thebamm.org/wp/The_Business_Change_EcoSystem_and_Maturity_Models_-_Press_Release.pdf.

Kaliski, Burton S; Encyclopedia of Business and Finance; New York Macmillan Reference USA, Gale Group, 2001, pp. 38, 70 and 199.

"Let ACC Help you Thrive in a Perpetual Changing World Environment," American Cybernetic Corporation, 2001, http://web.archive.org/web/20011214072250/http://www.amcybernetic.com/orgdev_overview.html.

Nixon, "Evaluating Design Performance," Int. J. of Technology Management, vol. 17, No. 7-8, p. 814-829, 1999. Abstract Only.

Veryard, Richard; "The Component Based Business: Plug and Play," Springer-Verlag, London, 2001.

American Heritage College Dictionary, fourth edition, Houghton Mifflin Harcourt, Boston, 2010, p. 1430.

Ferguson et al.; Enterprise Business Process Management-Architecture, Technology and Standards; Lecture Notes on Computer Science 4102, 1-15, 2006; pp. 1-18.

Black et al.; An Integration Model for Organizing It Service Management; 2007; IBM Systems Journal; 46,3; 18 pages.

Bieberstein et al.; Executing SOA: A Methodology for Service Modeling and Design; IBM Press, pp. 1-18; Jul. 2008.

Credle et al.; SOA Approach to Enterprise Integration for Product Lifecycle Management; IBM Redbook; pp. 1-506; Oct. 2008 (attached two files).

Meier; Service Oriented Architecture Maturity Models: A guide to SOA Adoption?; MS Thesis, Hogskolan Skovde; 2006; 53 pages.

Arsanjani et al., Service Integration Maturity Model (SIMM): Introduction; The Open Group IT Architect Practitioners Conference Miami 2006; 23 pages.

Cherbakov et al., Impact of Service Orientation at the Business Level; IBM Systems Journal, vol. 44, No. 4, 2005; pp. 653-668.

* cited by examiner

| INDUSTRY SOLUTIONS MAP (for Industry / Service Line X) | |
|---|---|
| Strategic Driver | Driver 1<br>Driver 2<br>:<br>Driver N |
| Industry Solution | Solution 1<br>:<br>Solution N |
| Solution Offering | Offering 11 (for Solution 1)<br>:<br>Offering NN (for Solution N) |
| Framework | Framework 1<br>:<br>Framework N |
| Infrastructure | Infrastructure Element 1<br>:<br>Infrastructure Element N |
| Other Elements | Other Element 1<br>:<br>Other Element N |

FIG. 14

| Business Administration | Product Management | Acquisitions | Customer Portfolio Management | Customer Service and Sales | Product Operations | Customer Accounting | Financial Management |
|---|---|---|---|---|---|---|---|
| Business Planning | Sector Marketing Plans | | Customer Portfolio and Analysis | Customer Servicing and Sales Planning | Product Operations Management | Customer Accounting Policies | Risk Management |
| Business Architecture | Managing Products | Acquisition Planning and Oversight | Credit and Risk Management | | | | |
| Business Unit Administration | Product Development and Deployment | | Application Processing | Case Handling | Operations Administration | Reconciliations | Securitization |
| Manage Alliance Relationships | | | Customer Behavior Decisioning | Service/Sales Administration | | | Financial Control |
| Policy & Procedure Manuals | | | | | | | |
| HR Management | | Target Lists (Prospecting) | Customer Profile | Sales and Cross-Sell | Authorizations | Billing | Treasury |
| Administer Alliance SLAs | Marketing | Campaign Execution | Contact/ Event History | Servicing (Dialogue Handler) | Financial Capture | Payments | Financial Consolidation |
| Audit/ QA/ Legal | | | | | | | |
| Facilities | Market Research | | Correspondence | Smart Routing | Product Processing | Customer Account | Collections and Recovery |
| Develop and Operate Systems | Product Directory | | | | Rewards Management | | |
| Accounting and G/L | | | | | Inventory Management | Merchant Operations | |

Row labels (left side): Planning & Analysis; Checks & Controls; Execution

PUBLISHING AN INDUSTRY BUSINESS ARCHITECTURE MODEL

CROSS REFERENCE TO RELATED APPLICATION

This application is related to U.S. application Ser. No. 12/701,245 filed Feb. 5, 2010 entitled SYSTEM FOR ENHANCING BUSINESS PERFORMANCE. This application is also related to U.S. application Ser. No. 12/632,256 filed Dec. 7, 2009 entitled ASSESSING THE MATURITY OF AN INDUSTRY ARCHITECTURE MODEL. This application is also related to U.S. application Ser. No. 12/630,063 filed Dec. 3, 2009 entitled SYSTEM FOR MANAGING BUSINESS PERFORMANCE USING INDUSTRY BUSINESS ARCHITECTURE MODELS. This application is also related to U.S. application Ser. No. 12/631,092 filed Dec. 4, 2009 entitled TOOL FOR CREATING AN INDUSTRY BUSINESS ARCHITECTURE MODEL. The above four related applications shall be incorporated herein by reference in their entireties.

BACKGROUND OF THE INVENTION

1. Field of the Invention

The invention relates to methods and apparatus for making industry business architecture models (IBAMs) accessible to business consultants and other general users. In particular the invention permits navigation, display and publishing of IBAMs and associations therebetween for a plurality of industries, solutions, offerings, and versions.

2. Description of the Related Art

Rackham in U.S. application Ser. No. 10/796,367 describes the component modeling process and elements. In particular Rackham describes a component business modeling map and a process for filtering this map to form a heat map of components.

Bhaskaran in U.S. application Ser. No. 10/692,898 filed Oct. 24, 2003 discloses end-to-end business process solution creation with business measurements and initiatives according to defined business goals and objectives of an entity. Business operations of the entity are modeled in terms of business process elements including process tasks, artifact flows, artifact repositories and business commitment elements including key performance indicators. Bhaskaran's model and process elements may be continuously refined over a solution development lifecycle.

Ang in U.S. application Ser. No. 11/496,917 filed Jul. 31, 2006 describes a goal-service modeling approach using key performance indicators for measurement of attainment of goals. Rackham, Bhaskaran, and Ang shall be incorporated herein by reference in their entireties.

Bhandari in U.S. application Ser. No. 12/630,063 filed Dec. 3, 2009 and Ser. No. 12/631,092 filed Dec. 4, 2009 describes systems for creating industry business architecture models and for managing business performance using such models. Bhandari also describes in U.S. application Ser. No. 12/632,256 filed Dec. 7, 2009 a system for assessing the maturity of such industry business architecture models. The above three applications by Bhandari shall be incorporated herein by reference in their entireties.

BRIEF SUMMARY OF THE INVENTION

The system of the present invention is used to make IBAMs available to business consultants and other general users to browse, navigate, display, and consume IBAM content easily. It is a data driven solution framework for publishing a plurality of IBAMs and their constituent model elements, along with all the relationships and associations within and between IBAMs. The invention takes an existing IBAM, which has been created using the systems and methods described in the incorporated references, and captures, depicts, and publishes the elements and the associations, relationships, and linkages between and within the elements.

BRIEF DESCRIPTION OF THE SEVERAL VIEWS OF THE DRAWINGS

FIG. 14 is an example of an Industry Solutions Map, and its constituent elements such as Industry Solutions or Solution Offerings, with which an IBAM may be associated as depicted in FIG. 1.

FIG. 17 illustrates a map of components; and

DETAILED DESCRIPTION OF THE INVENTION

The construction of an IBAM and its creation are described in incorporated U.S. patent application Ser. Nos. 12/603,063 and 12/631,092. Various tools may be used to create the individual models of an IBAM. For example, (a) IBM CBM Tool, a product of International Business Machines Corporation of Armonk, N.Y., may be used to create CBM models; (b) IBM Websphere Business Modeler, a product of International Business Machines Corporation of Armonk, N.Y., may be used to create process models; (c) IBM Rational Software Architect with SOMA-ME plugin, a product of International Business Machines Corporation of Armonk, N.Y., may be used to create service models; (d) IBM Infosphere Data Architect, a product of International Business Machines Corporation of Armonk, N.Y., may be used to create data models. Other equivalent software products and tools may also be used. Collateral and documents may be created through tools such as word processors, spreadsheets, HTML editors, or any other tools.

However, none of the existing tools recognize or address the capability of publishing an IBAM in its entirety. The term "publishing" shall be taken herein to mean making IBAMs and their content accessible to business consultants and other general users over the network or in disconnected mode for browsing, viewing, navigating, updating, and using the content therein in their work. In addition, none of the existing tools address the capability for publishing, display or navigation of IBAMs and its constituent model elements, along with the various associations within and between IBAMs and other related elements and concepts. The present invention provides such a tool, as described below.

The present invention provides a generic and technology-agnostic data-driven framework comprising: (a) a role-based and business rule-based context-aware mechanism for navigation of IBAMs and their constituent model elements and the various associations within and between the elements and/or IBAMs; (b) a flexible data model schema to capture and depict IBAMs and their constituent model elements and associations. The present invention also provides an example IBAM publishing system and tool which uses this data-driven framework and data model schema for capture and publishing of IBAMs over a network or in disconnected mode.

FIGS. 1, 2, 3, 4, 5 and 6 together constitute the overall entity diagram for all the logical data entities representing an IBAM and all its constituent models, sub-models and associated elements, as described below. These logical data entities and their relationships and associations constitute the flexible data model schema, and also represent the superset of all possible combinations of elements and related associations that form the overall navigation hierarchy for an IBAM.

Figure 1:
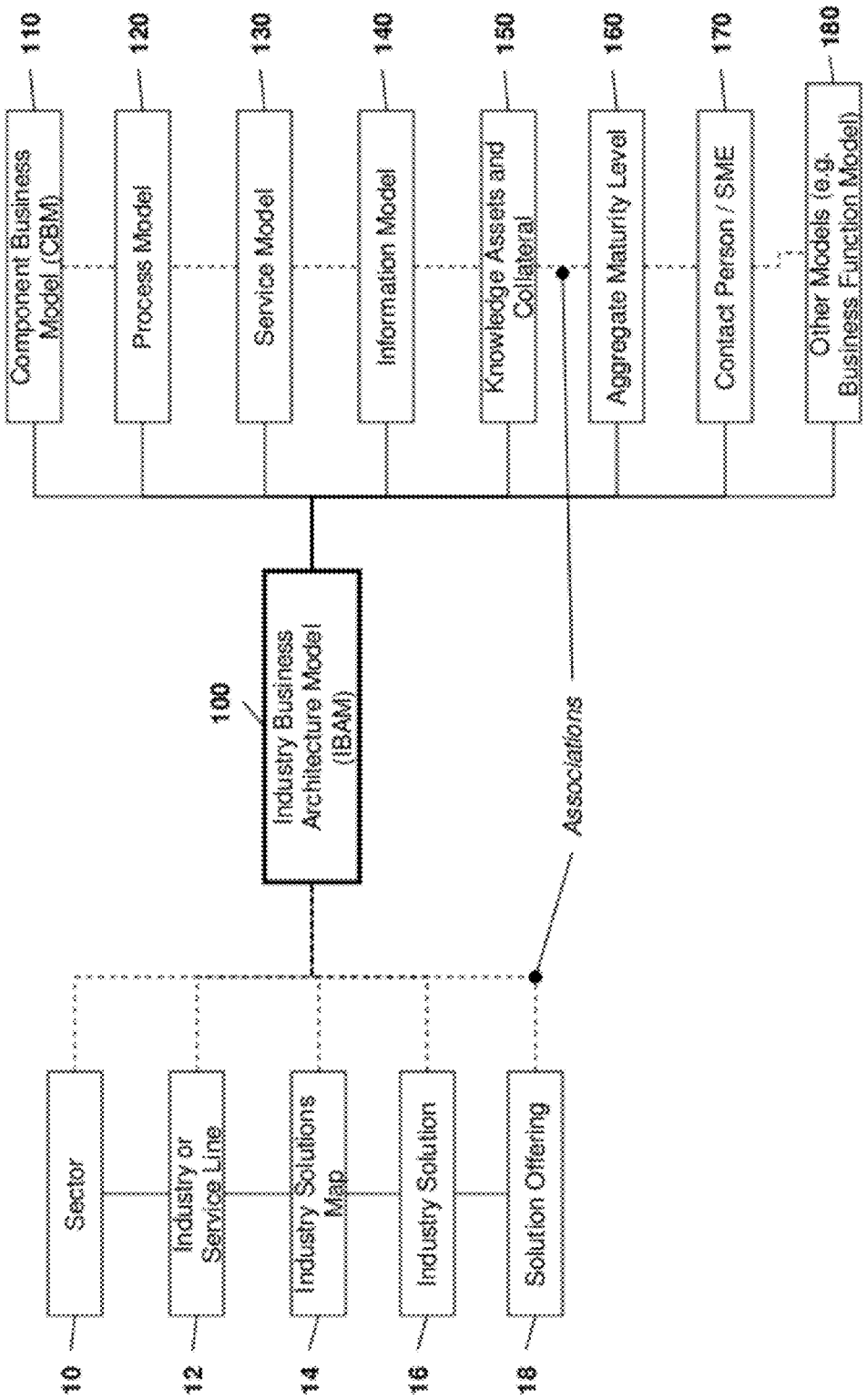
FIG. 1 is a high level representation of an example hierarchy for navigation in a published IBAM.

In FIG. 1, a Sector 10 may contain multiple Industries or Service Lines 12. Each Industry 12 may have one or more Industry Solutions Map 14. An example Industry Solutions Map is shown in FIG. 14. Each Industry Solutions Map 14 may have one or more Industry Solution 16, and each Industry Solution 16 may have Solution Offerings 18. An Industry Business Architecture Model 100 may be associated with one or more Industry Solutions or Solution Offerings, with one or more Industry Solutions Maps, and in some cases even with multiple industries or service lines and/or sectors.

An IBAM 100 may contain one or more Component Business Model (CBM) 110, one or more Process Model 120, one or more Service Model 130, one or more Information Model 140, Knowledge Assets and Collateral 150, one or more Contact Person 170 and Other Models 180. Each IBAM also has an Aggregate Maturity Level 160. Within an IBAM, the constituent elements of CBM, Process Model, Service Model, Information Model, Knowledge Assets and Collateral, Other Models and Contact Persons may be associated in a predefined or a random manner.

Figure 2:
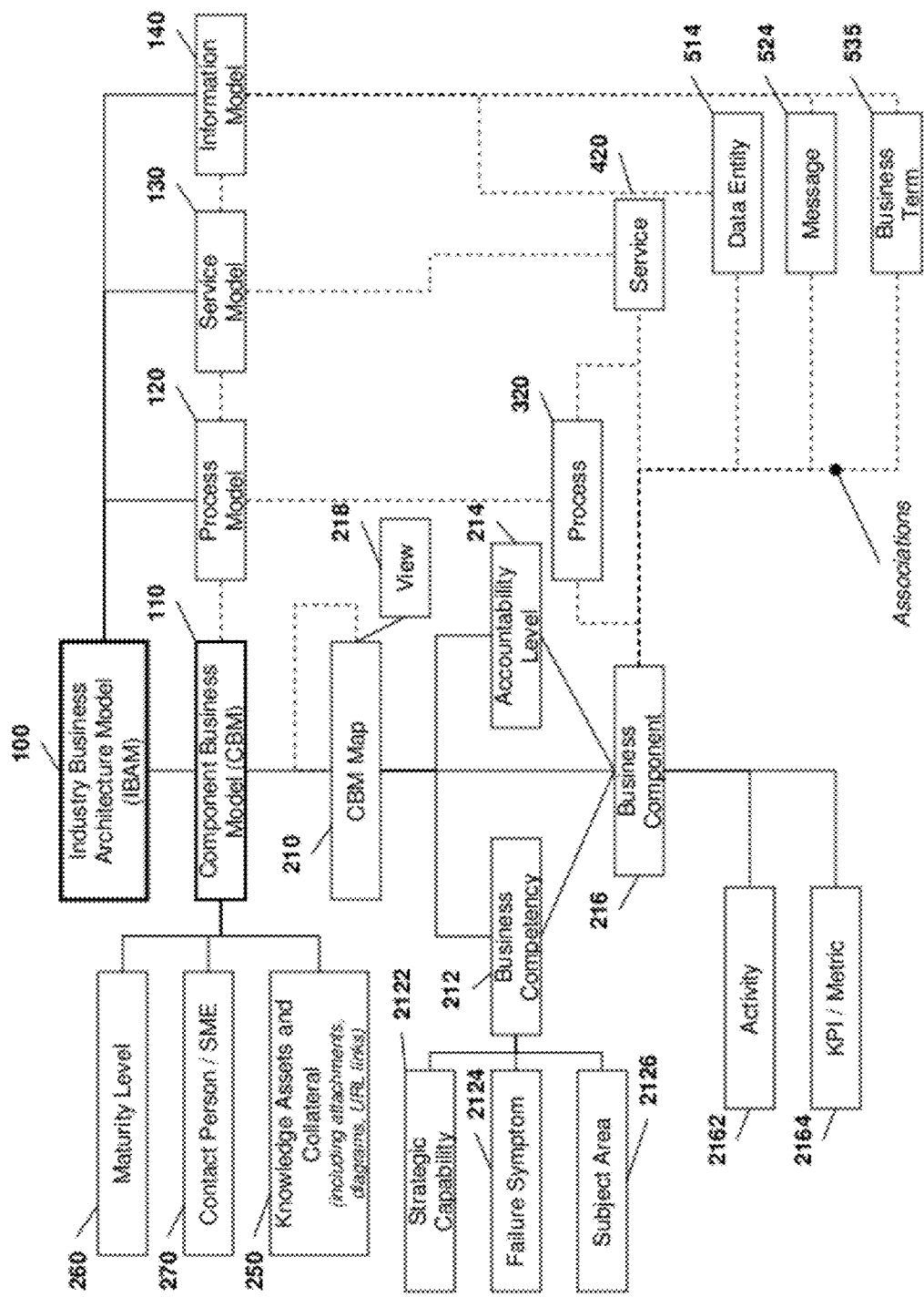
FIG. 2 is a representation of an example hierarchy for navigation of a Component Business Model (CBM) and its associated elements in a published IBAM.

In FIG. 2, an IBAM 100 may contain one or more Component Business Model (CBM) 110. Each CBM may have a Maturity Level 260, Contact Person/SME 270 identified and Knowledge Assets and Collateral 250. Each CBM may contain one or more CBM Map 210. Each CBM Map contains one or more Business Competency 212, one or more Accountability Level 214 and one or more Business Component 216. A CBM Map may also contain one or more View 218. A Business Competency 212 may have Strategic Capability 2122, Failure Symptom 2124 and Subject Area 2126. A Business Component 216 may have Activity 2162 and KPI/Metric 2164. A Business Component may also be associated with one or more Process 320, one or more Service 420, one or more Data Entity 514, one or more Message 524 and one or more Business Term 535. These associations can be direct (such as Business Component is associated with Process) or derived (such as Message is associated with Service; Service is associated with Process; Process is associated with Business Component; thus Message is associated with Business Component).

Figure 3:
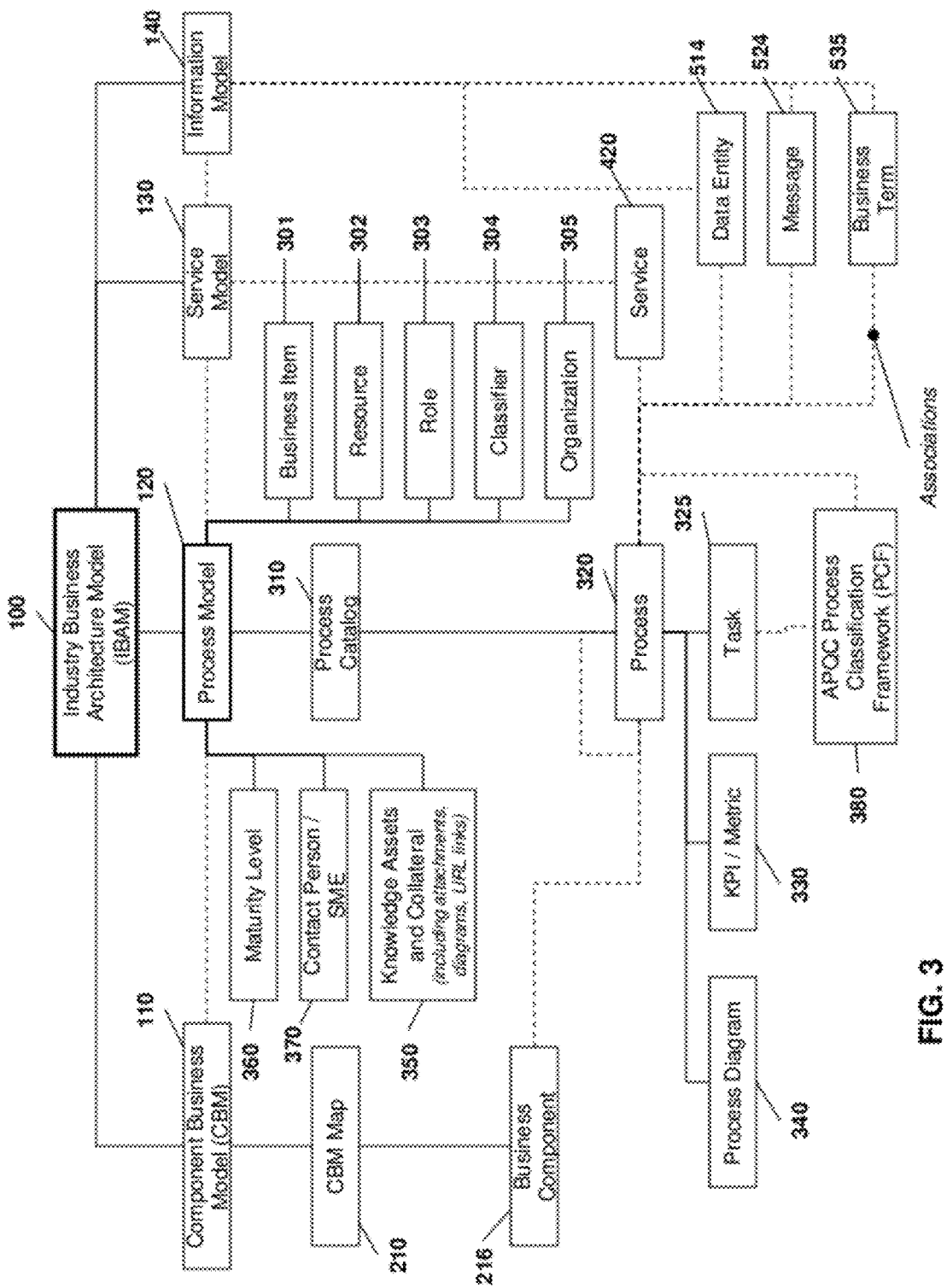
FIG. 3 is a representation of an example hierarchy for navigation of a Process Model and its associated elements in a published IBAM.

In FIG. 3, an IBAM 100 may contain one or more Process Model 120. Each Process Model may have a Maturity Level 360, Contact Person/SME (Subject Matter Expert) 370 identified and Knowledge Assets and Collateral 350. Each Process Model contains one or more Process Catalog 310, one or more Business Item 301, one or more Resource 302, one or more Role 303, Classifier 304, and Organization 305. These terms have the same meaning as their standard meaning in the context of the domain or subject of Process Modeling. A Process Catalog 310 contains one or more Process 320. There may be more than one instance of Process 320. A Process can contain one or more Task 325. A Process is depicted by a Process Diagram 340 and can contain or be associated with one or more KPI/Metric 330. A Process Catalog, Process or Task can be associated with industry standard process hierarchies such as those defined by the APQC Process Classification Framework (PCF) 380. A Process may also be associated with one or more other Process 320 or another instance of Process 320, one or more Business Component 216, one or more Service 420, one or more Data Entity 514, one or more Message 524 and one or more Business Term 535. These associations can be direct (such as Process is associated with Business Component) or derived (such as Message is associated with Service; Service is associated with Process; thus Message is associated with Process).

Figure 4:
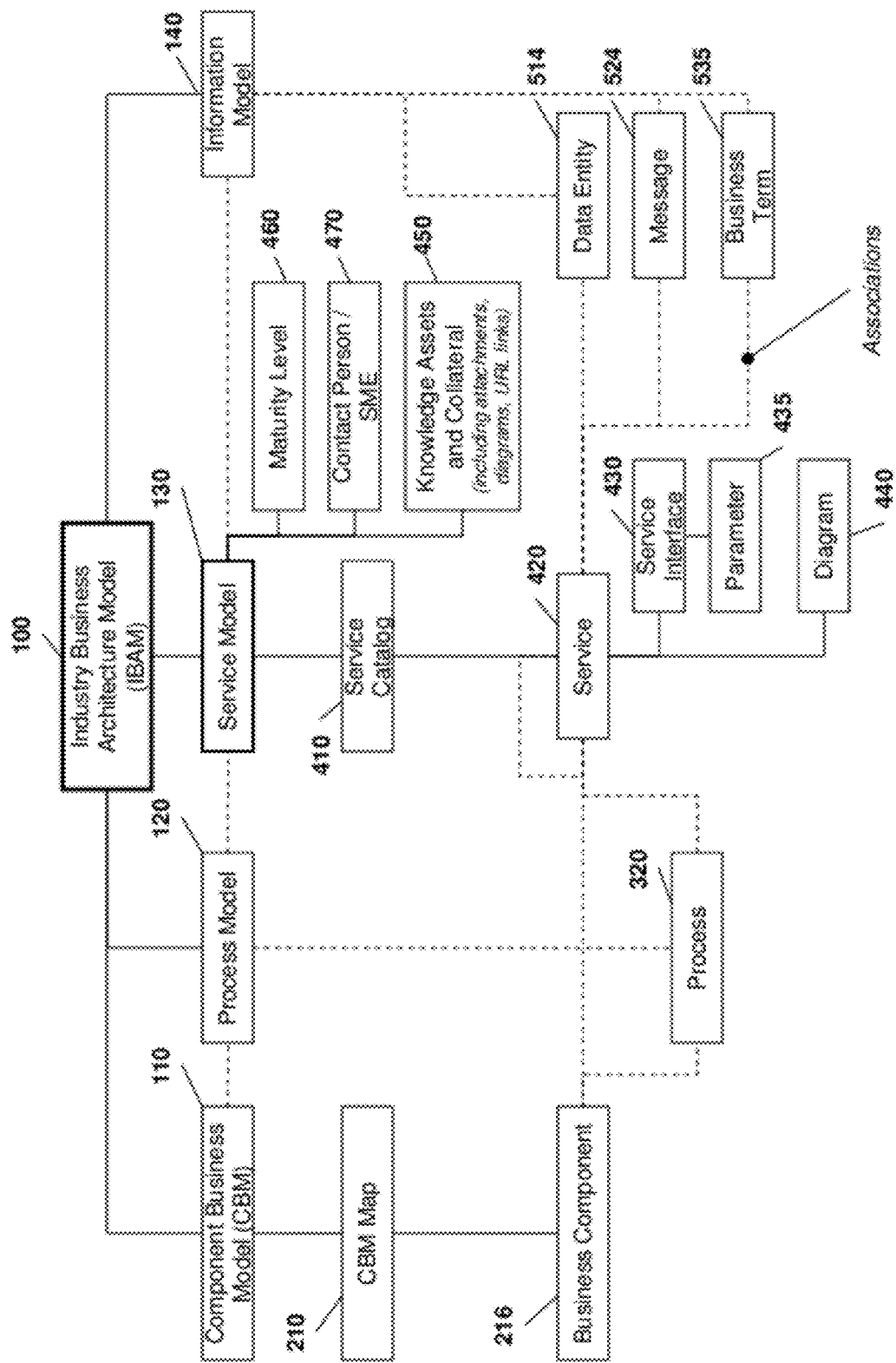
FIG. 4 is a representation of an example hierarchy for navigation of a Service Model and its associated elements in a published IBAM.

In FIG. 4, an IBAM 100 may contain one or more Service Model 130. Each Service Model may have a Maturity Level 460, Contact Person/SME 470 identified and Knowledge Assets and Collateral 450. Each Service Model contains one or more Service Catalog 410. A Service Catalog contains one or more Service 420. There may be more than one instance of Service 420. A Service can have one or more Service Interface 430. A Service can be depicted by a Service Diagram 440. Each Service Interface 430 can have one or more Parameter 435. A Service may also be associated with one or more other Service 420 or another instance of Service 420, one or more Business Component 216, one or more Process 320, one or more Data Entity 514, one or more Message 524 and one or more Business Term 535. These associations can be direct (such as Process is associated with Service) or derived (such as Business Component is associated with Process; Process is associated with Service; thus Business Component is associated with Service).

Figure 5:
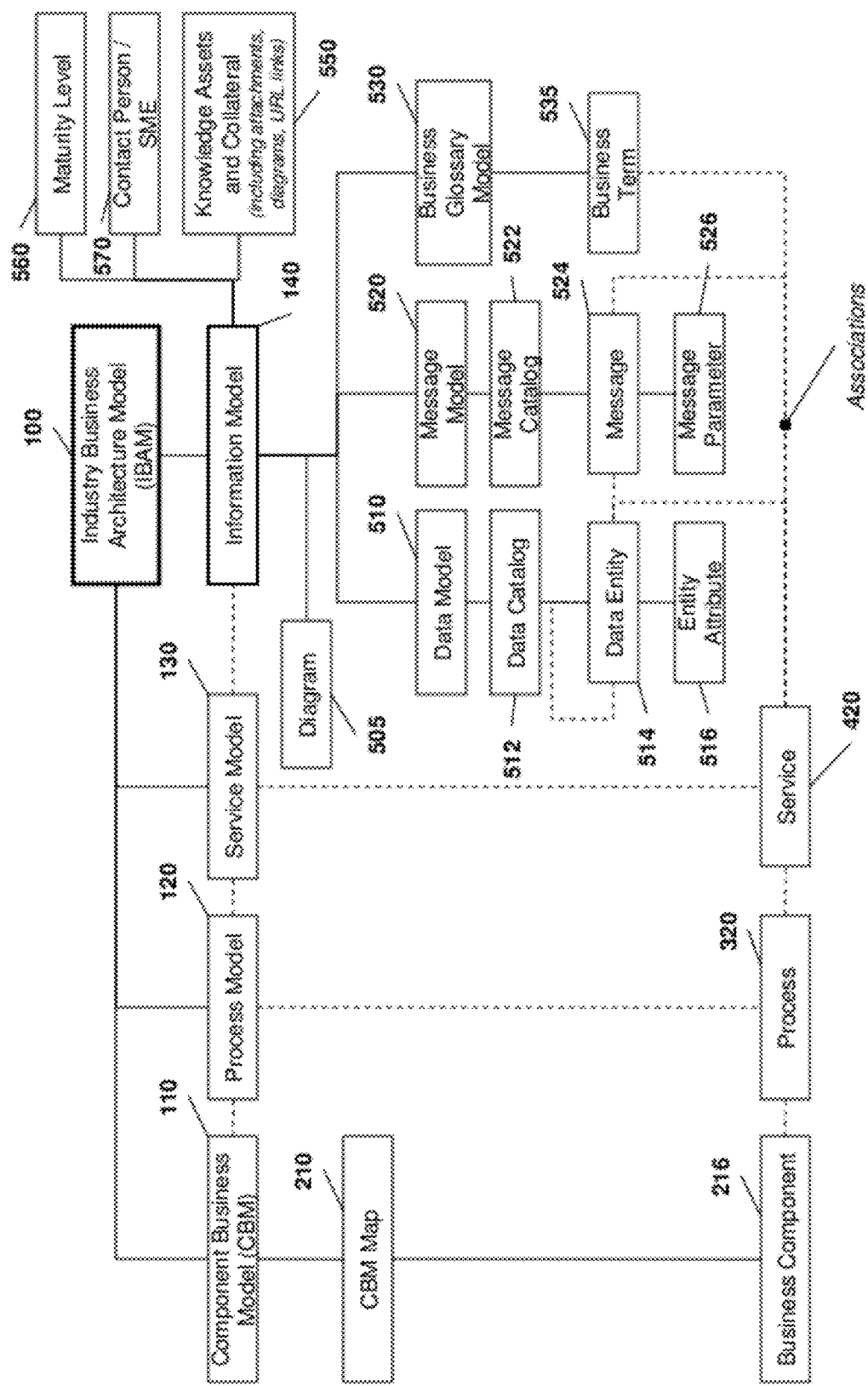
FIG. 5 is a representation of an example hierarchy for navigation of an Information Model, its sub-models including a Data Model, a Message Model and a Business Glossary Model, and their associated elements in a published IBAM.

In FIG. 5, an IBAM 100 may contain one or more Information Model 140. Each Information Model may have a Maturity Level 560, Contact Person/SME 570 identified and Knowledge Assets and Collateral 550. Each Information Model contains Data Model 510, Message Model 520 and Business Glossary Model 530. An Information Model can be depicted by one or more diagram 505 (such as an entity relationship diagram, etc). A Data Model 510 consists of one or more Data Catalog 512. A Data Catalog can have one or more Data Entity 514, and each Data Entity has one or more Entity Attribute 516. There may be more than one instance of Data Entity 514. A Message Model 520 consists of one or more Message Catalog 522. A Message Catalog can have Message 524, and each Message has Message Parameter 526. There may be more than one instance of Message 524. A Business Glossary Model 530 contains Business Term 535. A Data Entity or Message may be associated with one or more other Data Entity 514 or another instance of Data Entity 514, one or more other Message 524 or another instance of Message 524, one or more Business Term 535, one or more Service 420, one or more Process 320, and one or more Business Component 216. These associations can be direct (such as Data Entity is associated with a Message) or derived (such as Business Component is associated with Process; Process is associated with Service; Service is associated with Message; thus Business Component is associated with Message).

Figure 6:
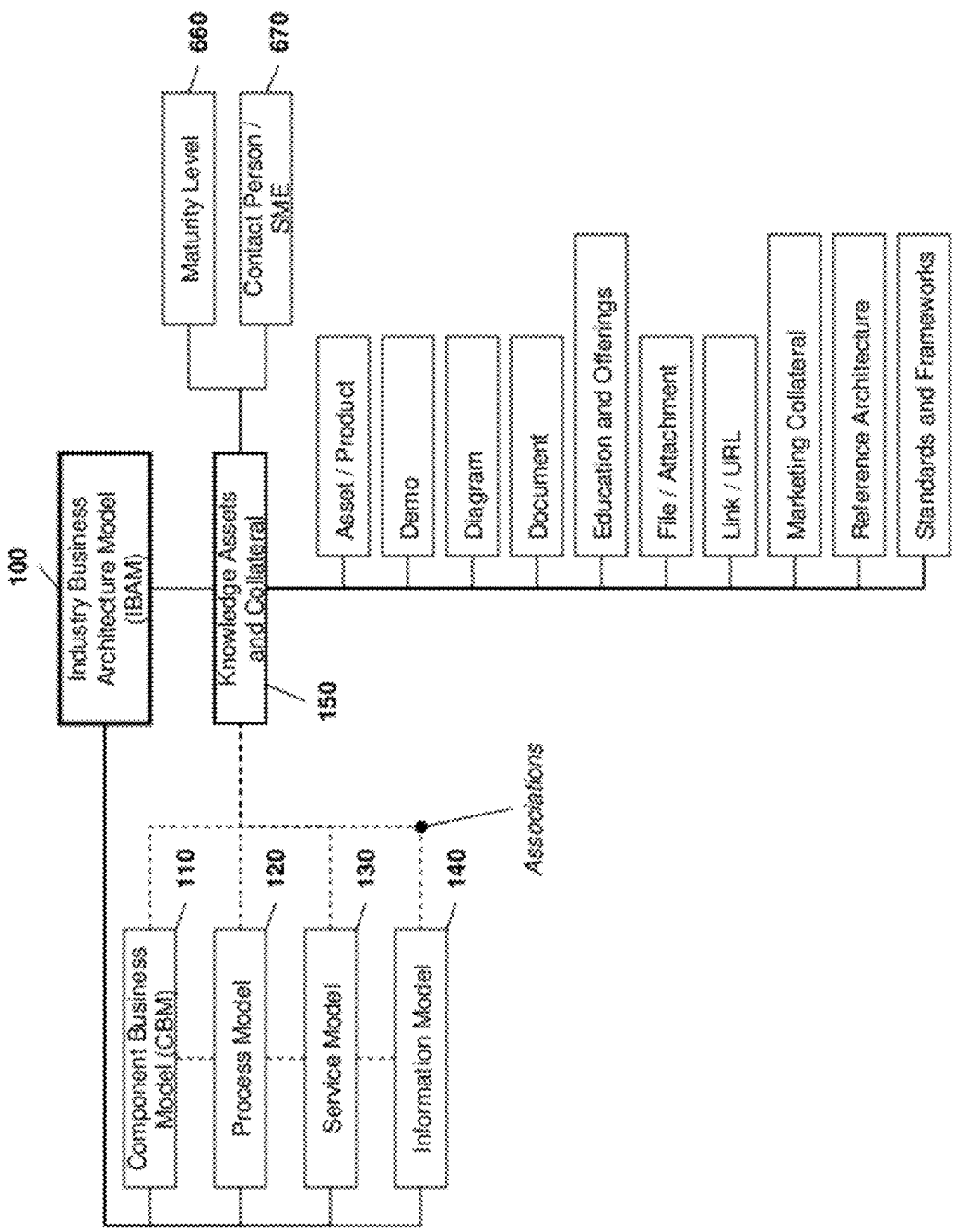
FIG. 6 is a representation of an example hierarchy for navigation of the Knowledge Assets and Collateral and its associated elements in a published IBAM.

In FIG. 6, an IBAM 100 may contain one or more Knowledge Assets and Collateral 150, each of which may have Maturity Level 660 and a Contact Person/SME 670 identified. Knowledge Assets and Collateral may consist of different types of artifacts such as Assets/Products, Demos, Diagrams, Documents, Education and Offerings, File/Attachments, Links/URLs, Marketing Collateral, Reference Architectures, Standards and Frameworks and other collateral. Other models within an IBAM 100, such as CBM 110, Process Model 120, Service Model 130 and Information Model 140 can have associated Knowledge Assets and Collateral 150. The Knowledge Assets and Collateral elements numbered 150, 250, 350, 450 and 550 as depicted in FIGS. 1, 2, 3, 4, 5 and 6, are similar.

The Maturity Level 260, 360, 460, 560 and 660 is related to the Aggregate Maturity Level 160 in the same manner as described by Bhandari in U.S. application Ser. No. 12/632,256 filed Dec. 7, 2009 entitled ASSESSING THE MATURITY OF AN INDUSTRY ARCHITECTURE MODEL.

FIGS. 7, 8, 9, 10, 11, 12 and 13 together depict the main components of the example IBAM publishing system which implements the data-driven framework and flexible data model schema of the present invention and provides a role-based and business rule-based context-aware mechanism for navigation of IBAMs and their constituent model elements and the various associations within and between the elements and/or IBAMs.

Figure 7:
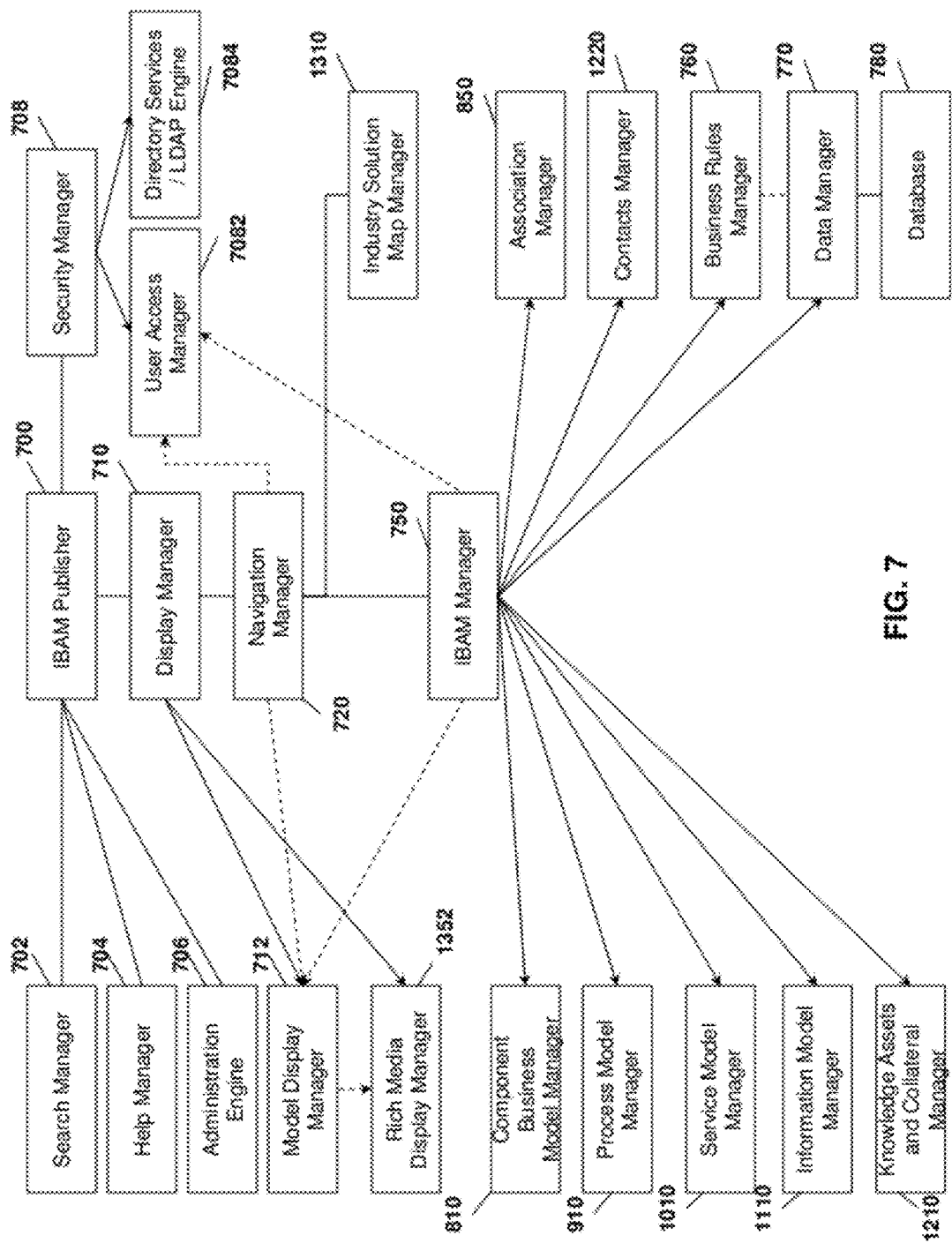
FIG. 7 is a simplified block diagram of an example IBAM publishing system.

In FIG. 7, there is shown an example IBAM publishing system is depicted by the highest level component IBAM Publisher 700. The IBAM Publisher component represents the overall mechanism and tool for publishing an IBAM. It may be realized as a software application or tool using any appropriate combination of technologies and architecture and design constructs. The IBAM Publisher component consists of other components such as Search Manager 702, Help Manager 704, Administration Engine 706, Security Manager 708, Display Manager 710, Navigation Manager 720 and IBAM Manager 750.

All search functionality within the IBAM Publisher is controlled by the Search Manager 702 component. This includes context-sensitive, parametric or generic search, or search using any external mechanism or service.

The Help Manager component 704 provides user help, including context-sensitive help, generic help, Frequently Asked Questions, etc. The Administration Engine 706 component is the controller for all the functionality required for the administration of the tool, including user administration, data updates, etc.

The Security Manager 708 component has the responsibility for managing the overall security of the IBAM publishing mechanism. The User Access Manager 7082 component controls the access that individual users have to specific models, artifacts, navigation hierarchies and other published elements. The Directory Services Engine 7084 component provides an appropriate user authentication and authorization mechanism.

The Display Manager 710 component controls the display and user interface for the entire IBAM publishing mechanism. The Display Manager controls the Model Display Manager 712 component. The Model Display Manager component controls the display and interface for individual models such as Component Business Model, Process Model, Service Model, Information Model, etc. It is also used by the IBAM Manager 750 component to control the display and interface for an IBAM. The Display Manager also controls the Navigation Manager 720 component.

The Navigation Manager 720 component controls navigation hierarchies and user navigation throughout the IBAM publishing mechanism. This component, in turn, is used by the Display Manager component for user navigation features.

The IBAM Manager 750 component controls all aspects related to the publishing and display of an IBAM 100. It uses the Model Display Manager 712 component to control the display for the constituent models such as Component Business Model, Process Model, Service Model, Information Model, Knowledge Assets and Collateral, etc. The IBAM Manager component manages and controls the components Component Business Model Manager 810, Process Model Manager 910, Service Model Manager 1010, Information Model Manager 1110, Knowledge Assets and Collateral Manager 1210, Association Manager 850, Contacts Manager 1220, Business Rules Manager 760, Data Manager 770 and Database 780.

The Business Rules Manager 760 component manages all business rules applicable for the publishing, display and/or role-based navigation of IBAMs or their constituent model elements. It is used/invoked by all other components as required.

The Data Manager 770 component provides the data interfaces/application programming interfaces (APIs)/services required to interact with the Database 780 or data repository which stores the IBAM data/content. It is the main component responsible for managing interactions with the database, and is used by all other components for all data transactions (create/read/update/delete). Other components cannot directly interact with the database.

The Database 780 component implements the IBAM data model/schema and stores all IBAM-related data. This component may be realized through a combination of data repositories (including relational databases) and content repositories (for rich media) in a flexible manner. The data and content may be locally stored or it may be on the network.

Figure 8:
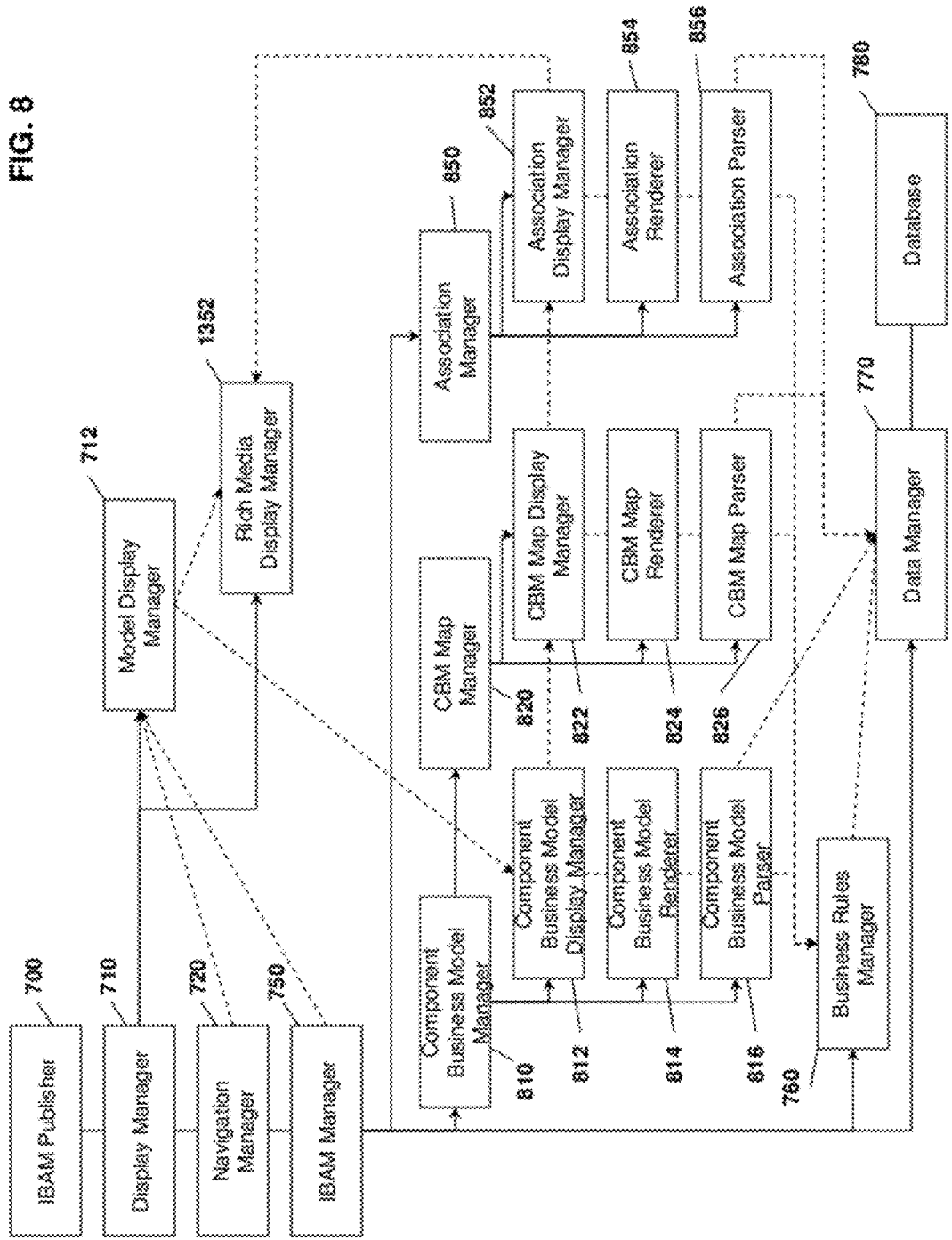
FIG. 8 is a simplified block diagram depicting the main components for publishing and display of a Component Business Model (CBM) and its associations with other elements, for the example IBAM publishing system of FIG. 7.

In FIG. 8, the IBAM Manager 750 component manages the Component Business Model Manager 810 and Association Manager 850 components. The Component Business Model Manager controls all aspects related to the publishing and display of Component Business Models, and controls the Component Business Model Display Manager 812, Component Business Model Renderer 814 and Component Business Model Parser 816 components. The Component Business Model Display Manager 812 component controls the display, user interface and views of the Component Business Model, and uses the Component Business Model Renderer 814 component to get the rendered model views for display. The Component Business Model Renderer component obtains the parsed data from the Component Business Model Parser 816 component, and renders the Component Business Models through pre-defined or user-specified formatted views. The layout and look and feel of these views could be controlled by data received through the component call mechanism, through business rules or templates, or by any other means. The Component Business Model Parser component obtains the data from the database 780 or data repository through the IBAM Data Manager 770 component and parses it based on the applicable business logic and business rules as specified by the Business Rules Manager 760 component.

The Component Business Model Manager 810 manages the CBM Map Manager 820 component, which manages all aspects related to the publishing and display of a single CBM Map. It controls the CBM Map Display Manager 822, CBM Map Renderer 824 and CBM Map Parser 826 components. A Component Business Model could consist of multiple CBM Maps, in which case the Component Business Model Manager component would instantiate and interact with multiple instances of the CBM Map Manager component.

The CBM Map Display Manager 822 component controls the display, user interface, views and details for a single CBM Map. This component uses the CBM Map Renderer 824 component to get the rendered views for display. The CBM Map is displayed dynamically based on run-time choices made by the user. The Component Business Model Display Manager 812 component can use this component to display a formatted CBM Map.

The CBM Map Renderer 824 component obtains the parsed data from the CBM Map Parser component, and renders a CBM Map in formatted views. The layout and look and feel of these views could be controlled by data received through the component call mechanism, through business rules or templates, or by any other means.

The CBM Map Parser 826 component obtains the data for a single CBM Map through the IBAM Data Manager component and parses it based on the applicable business logic and business rules. It sends the parsed data to the CBM Map Renderer component.

The Association Manager 850 component manages all aspects related to the publishing and display of associations or linkages between different elements of a model, or between different elements across models in an IBAM or across IBAMs. It controls the Association Display Manager 852, Association Renderer 854 and Association Parser 856 components.

The Association Display Manager 852 component controls the display of associations or linkages between different elements of a model, or between different elements across models in an IBAM or across IBAMs. This component uses the Association Renderer 854 component to get the rendered views for display. The associations or linkages are displayed dynamically based on model elements chosen at run-time by the user or based on the user's context in the navigation hierarchy. The Navigation Manager 720 component indirectly uses this component through the Model Display Manager 712 component.

The Association Renderer 854 component obtains the parsed data from the Association Parser 856 component, and renders associations or linkages between different elements of a model, or between different elements across models in an IBAM or across IBAMs as formatted views. The layout and look and feel of these views could be controlled by data received through the component call mechanism, through business rules or templates, or by any other means.

The Association Parser 856 component obtains the association data from the database through the Data Manager 770 component and parses it based on the applicable business logic and business rules. The data obtained from the database may be dynamically determined by the runtime choices made by the user (such as selecting a model element or clicking a specific link). The component sends the parsed data to the Association Renderer component.

Figure 9:
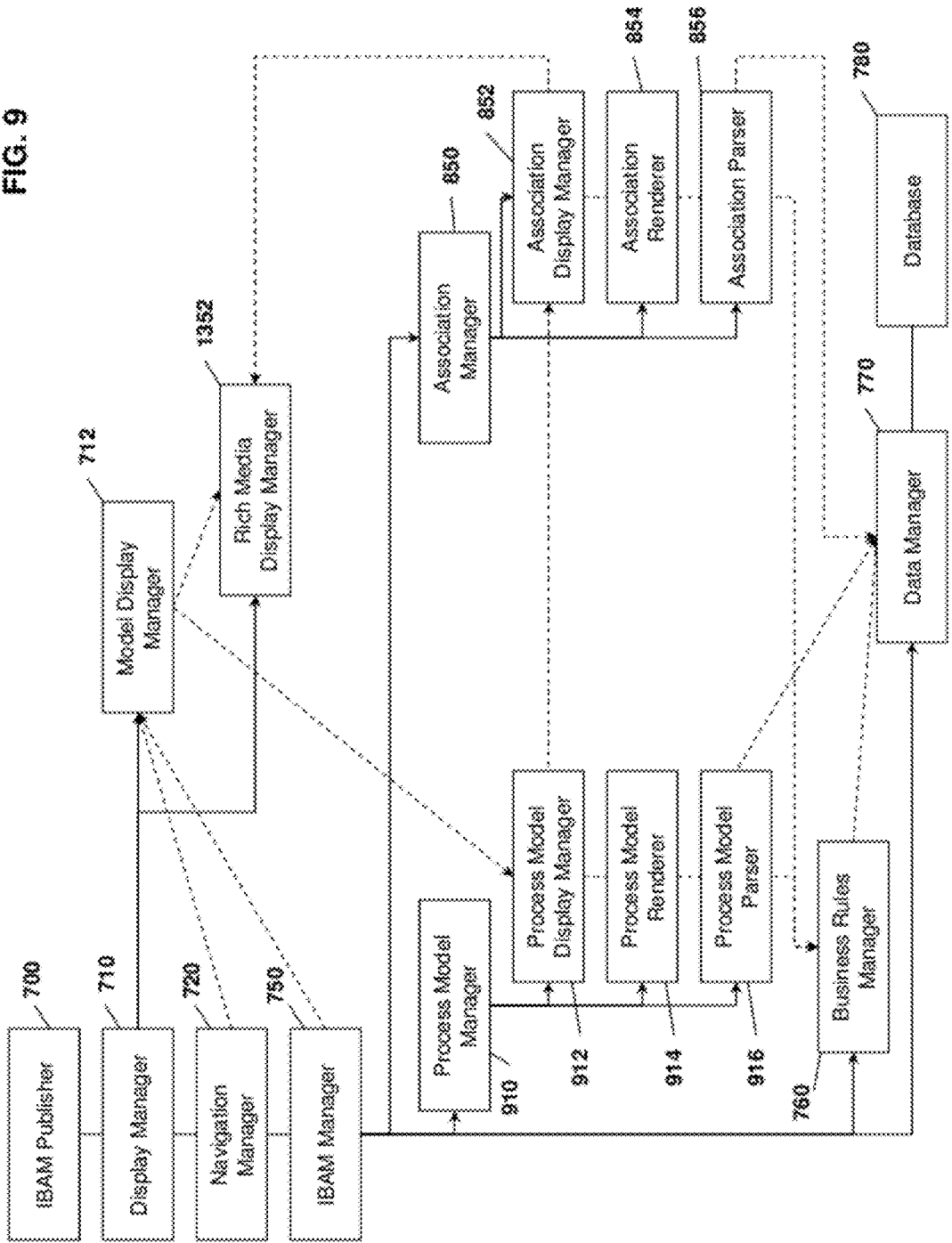
FIG. 9 is a simplified block diagram depicting the main components for publishing and display of a Process Model and its associations with other elements, for the example IBAM publishing system of FIG. 7.

In FIG. 9, the IBAM Manager 750 component manages the Process Model Manager 910 component. The Process Model Manager controls all aspects related to the publishing and display of process models, and controls the Process Model Display Manager 912, Process Model Renderer 914 and Process Model Parser 916 components. The Process Model Display Manager 912 component controls the display, user interface and views of the Process Model, and uses the Process Model Renderer 914 component to get the rendered model views for display. The Process Model Renderer component obtains the parsed data from the Process Model Parser 916 component, and renders the Process Models through pre-defined or user-specified formatted views. The layout and look and feel of these views could be controlled by data received through the component call mechanism, through business rules or templates, or by any other means. The Process Model Parser component obtains the data from the database 780 or data repository through the Data Manager 770 component and parses it based on the applicable business logic and business rules as specified by the Business Rules Manager 760 component.

Figure 10:
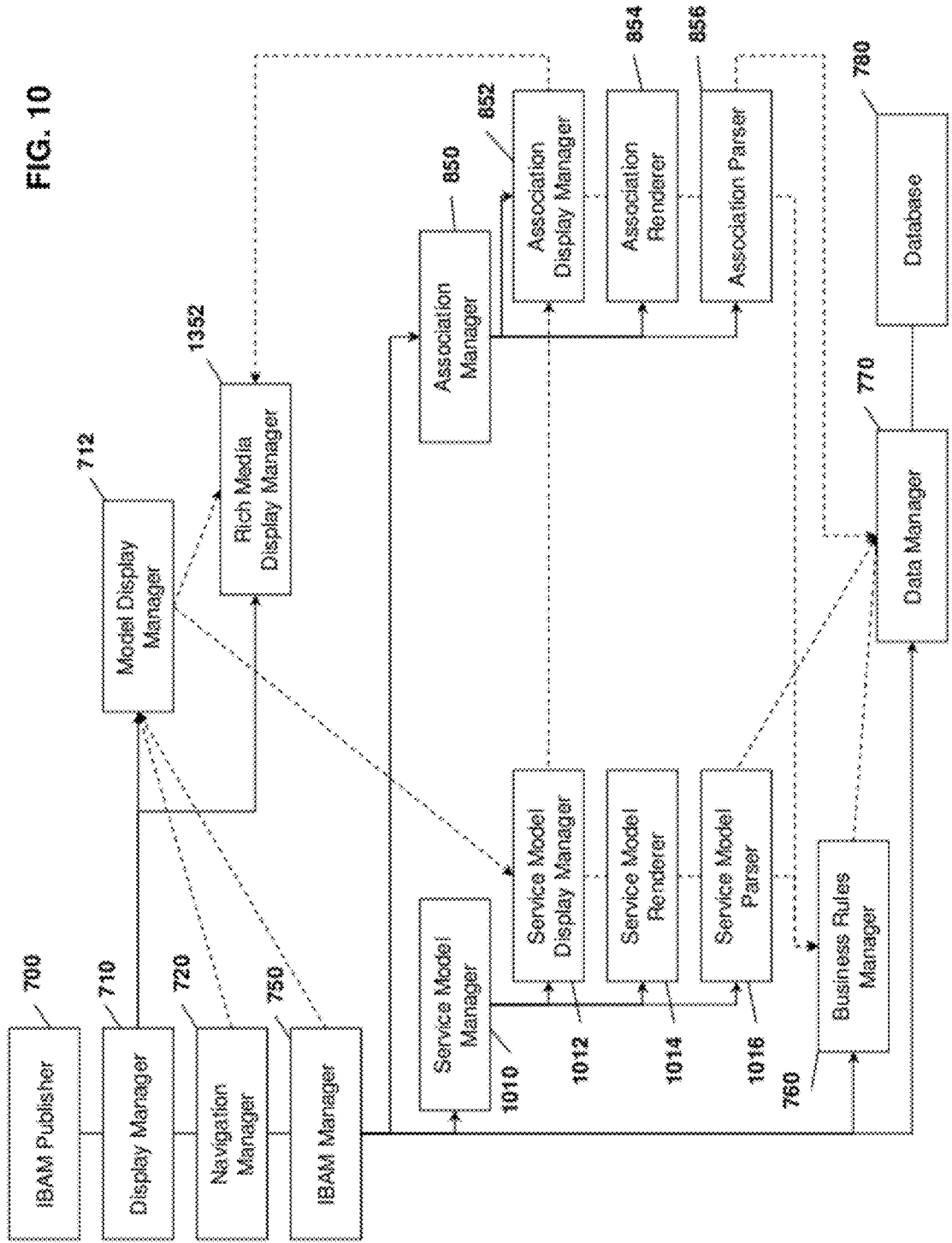
FIG. 10 is a simplified block diagram depicting the main components for publishing and display of a Service Model and its associations with other elements, for the example IBAM publishing system of FIG. 7.

In FIG. 10, the IBAM Manager 750 component manages the Service Model Manager 1010 component. The Service Model Manager controls all aspects related to the publishing and display of service models, and controls the Service Model Display Manager 1012, Service Model Renderer 1014 and Service Model Parser 1016 components. The Service Model Display Manager 1012 component controls the display, user interface and views of the Service Model, and uses the Service Model Renderer 1014 component to get the rendered model views for display. The Service Model Renderer component obtains the parsed data from the Service Model Parser 1016 component, and renders the Service Models through pre-defined or user-specified formatted views. The layout and look and feel of these views could be controlled by data received through the component call mechanism, through business rules or templates, or by any other means. The Service Model Parser component obtains the data from the database 780 or data repository through the Data Manager 770 component and parses it based on the applicable business logic and business rules as specified by the Business Rules Manager 760 component.

Figure 11:
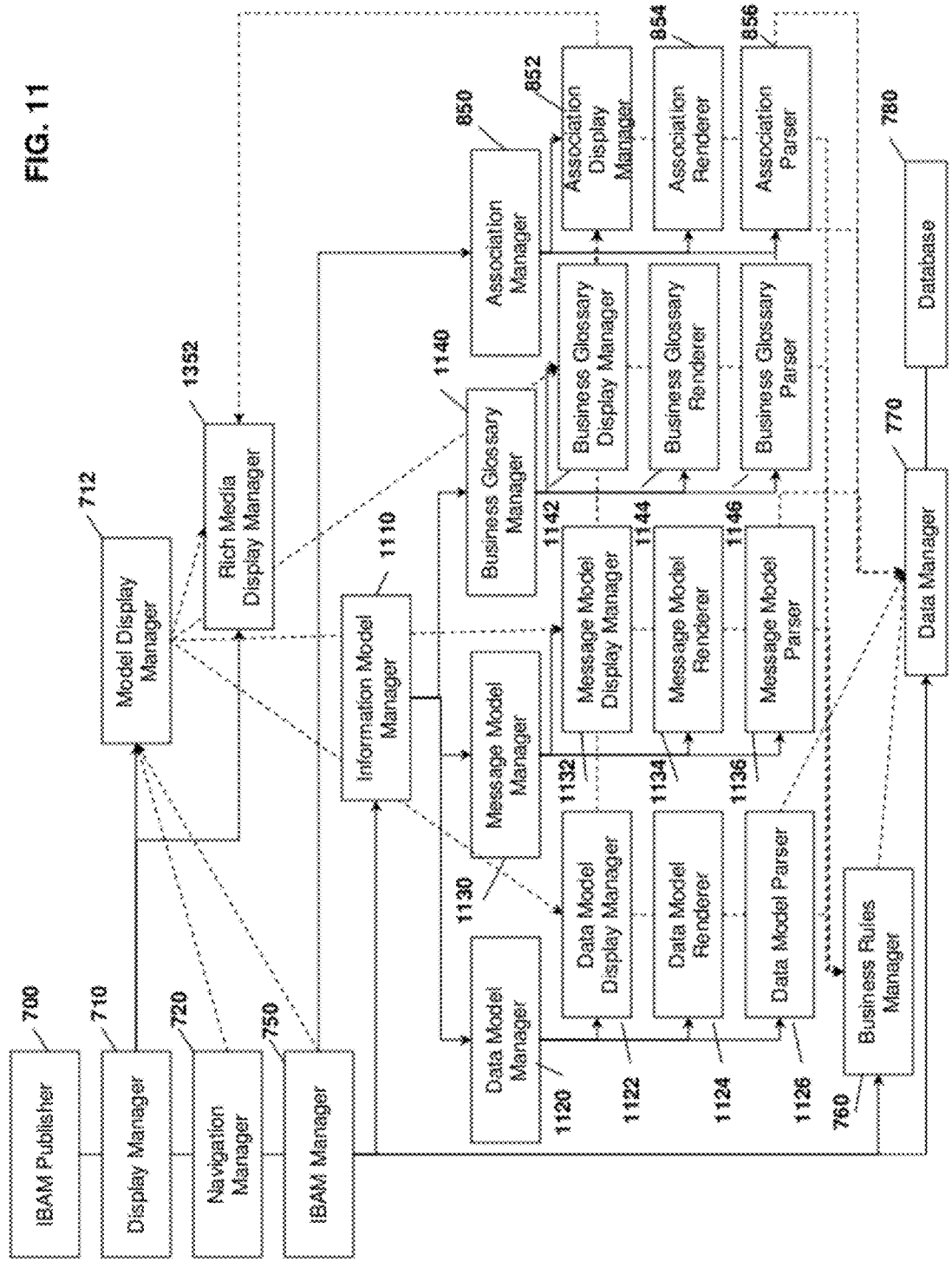
FIG. 11 is a simplified block diagram depicting the main components for publishing and display of an Information Model, its sub-models including a Data Model, a Message Model and a Business Glossary Model, and its associations with other elements, for the example IBAM publishing system of FIG. 7.

In FIG. 11, the IBAM Manager 750 component manages the Information Model Manager 1110 component which controls all aspects related to the publishing and display of information models. The Information Model Manager manages the Data Model Manager 1120, Message Model Manager 1130 and Business Glossary Manager 1140 components.

The Data Model Manager 1120 component controls all aspects related to the publishing and display of data models, and controls the Data Model Display Manager 1122, Data Model Renderer 1124 and Data Model Parser 1126 components. The Data Model Display Manager 1122 component controls the display, user interface and views of the Data Model, and uses the Data Model Renderer 1124 component to get the rendered model views for display. The Data Model Renderer component obtains the parsed data from the Data Model Parser 1126 component, and renders the Data Models through pre-defined or user-specified formatted views. The layout and look and feel of these views could be controlled by data received through the component call mechanism, through business rules or templates, or by any other means. The Data Model Parser component obtains the data through the Data Manager 770 component and parses it based on the applicable business logic and business rules as specified by the Business Rules Manager 760 component.

The Message Model Manager 1130 component controls all aspects related to the publishing and display of message models, and controls the Message Model Display Manager 1132, Message Model Renderer 1134 and Message Model Parser 1136 components. The Message Model Display Manager 1132 component controls the display, user interface and views of the Message Model, and uses the Message Model Renderer 1134 component to get the rendered model views for display. The Message Model Renderer component obtains the parsed data from the Message Model Parser 1136 component, and renders the Message Models through pre-defined or user-specified formatted views. The layout and look and feel of these views could be controlled by data received through the component call mechanism, through business rules or templates, or by any other means. The Message Model Parser component obtains the data through the Data Manager 770 component and parses it based on the applicable business logic and business rules as specified by the Business Rules Manager 760 component.

The Business Glossary Manager 1140 component manages the Glossary models within an Information Model, and controls all aspects related to the publishing and display of the glossary models/business terms. This component controls the Business Glossary Display Manager 1142, Business Glossary Renderer 1144 and Business Glossary Parser 1146 components. The Business Glossary Display Manager 1142 component controls the display, user interface and views of the Business Glossary Model, and uses the Business Glossary Renderer 1144 component to get the rendered model views for display. The Business Glossary Renderer component obtains the parsed data/business terms from the Business Glossary Parser 1146 component, and renders the Business Glossary Models through pre-defined or user-specified formatted views. The layout and look and feel of these views could be controlled by data received through the component call mechanism, through business rules or templates, or by any other means. The Business Glossary Parser component obtains the data through the Data Manager 770 component and parses it based on the applicable business logic and business rules as specified by the Business Rules Manager 760 component.

Figure 12:
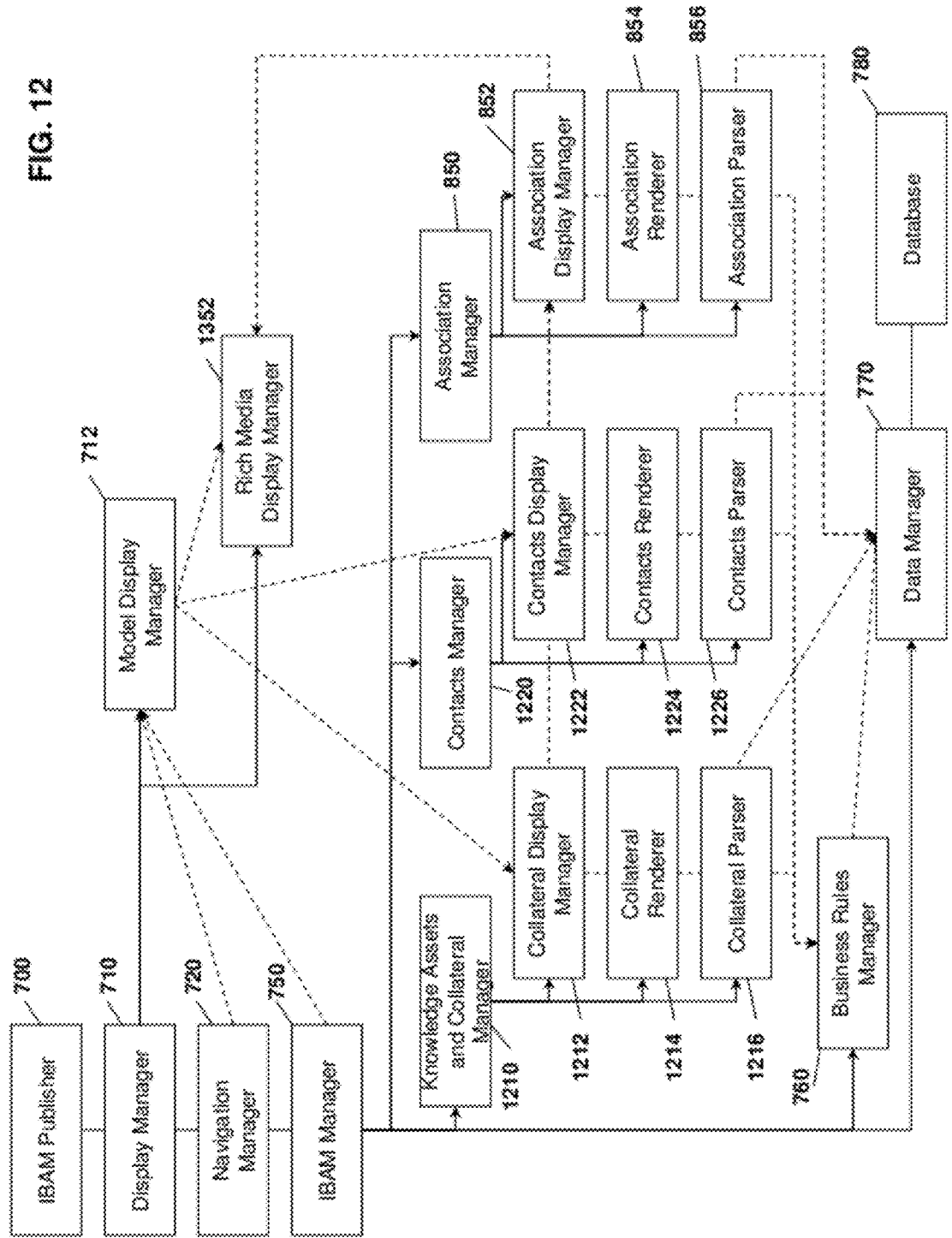
FIG. 12 is a simplified block diagram depicting the main components for publishing and display of Knowledge Assets and Collateral and Contacts, and their associations with other elements, for the example IBAM publishing system of FIG. 7.

In FIG. 12, the IBAM Manager 750 component manages the Knowledge Assets and Collateral Manager 1210 component. The Knowledge Assets and Collateral Manager controls all aspects related to the publishing and display of collateral and artifacts associated with an IBAM, and controls the Collateral Display Manager 1212, Collateral Renderer 1214 and Collateral Parser 1216 components. The Collateral Display Manager 1212 component controls the display, user interface and views of the collateral artifacts, and uses the Collateral Renderer 1214 component to get the rendered artifact views for display. The Collateral Renderer component obtains the parsed data from the Collateral Parser 1216 component, and renders the collateral artifacts through pre-defined or user-specified formatted views. The layout and look and feel of these views could be controlled by data received through the component call mechanism, through business rules or templates, or by any other means. The Collateral Parser component obtains the data from the Data Manager 770 component and parses it based on the applicable business logic and business rules as specified by the Business Rules Manager 760 component.

In FIG. 12, the IBAM Manager 750 component manages the Contacts Manager 1220 component. The Contacts Manager controls all aspects related to the publishing and display of contact names associated with an IBAM, and controls the Contacts Display Manager 1222, Contacts Renderer 1224 and Contacts Parser 1226 components. The Contacts Display Manager 1222 component controls the display, user interface and views of the contact information (including names, designation, areas of expertise, etc), and uses the Contacts Renderer 1224 component to get the rendered views for display. The Contacts Renderer component obtains the parsed data from the Contacts Parser 1226 component, and renders the contact information through pre-defined or user-specified formatted views. The layout and look and feel of these views could be controlled by data received through the component call mechanism, through business rules or templates, or by any other means. The Contacts Parser component obtains the data from the Data Manager 770 component and parses it based on the applicable business logic and business rules as specified by the Business Rules Manager 760 component.

Figure 13:
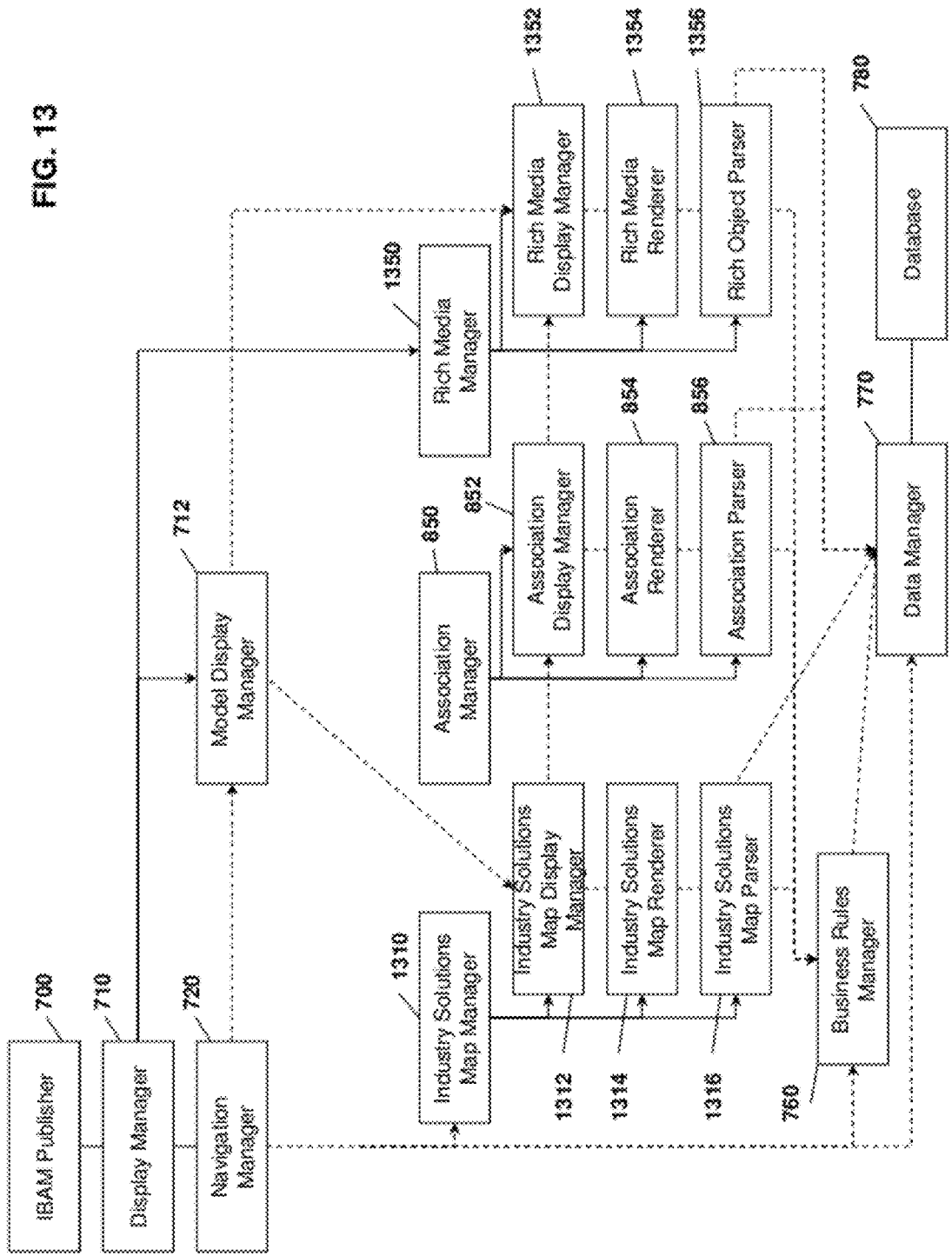
FIG. 13 is a simplified block diagram depicting the main components for publishing and display of Industry Solution Maps, Rich Media Objects (such as images, audio and video) and their associations with other elements, for the example IBAM publishing system of FIG. 7.

In FIG. 13, the Display Manager 710 component manages the Rich Media Manager 1350 component. The Rich Media Manager component manages all aspects related to the publishing and display of rich media such as audio, video, images and files or attachments that may be associated with IBAMs. It controls the Rich Media Display Manager 1352, Rich Media Renderer 1354 and Rich Object Parser 1356 components.

The Rich Media Display Manager 1352 component controls the display, user interface and views of rich media, based on the media type (audio, video, images, files). This component uses the Rich Media Renderer 1354 component for rendering of rich media, which may be displayed dynamically based on run-time choices made by the user.

The Model Display Manager 712, Component Business Model Display Manager 812, CBM Map Display Manager 822, Process Model Display Manager 912, Service Model Display Manager 1012, Data Model Display Manager 1122, Message Model Display Manager 1132, Business Glossary Display Manager 1142 and Association Display Manager 852 components use the Rich Media Display Manager 1352 component to handle the display of rich media such as audio, video, images and files in an IBAM.

The Rich Media Renderer 1354 component renders rich media such as audio, video, images or file attachments in supported formats, for display on the user interface. It provides its output to the Rich Media Display Manager. It gets its input data from the Rich Object Parser 1356 component.

The Rich Object Parser 1356 component processes rich objects (audio, video, images, attachments) which may be linked to a model element in an IBAM, based on the applicable business logic and business rules. The component sends the parsed data to the Rich Media Renderer component.

FIG. 13 depicts the Industry Solutions Map Manager 1310 component which manages all aspects related to the publishing and display of an Industry Solutions Map (an example of which is given in FIG. 14). The Industry Solutions Map Manager controls the Industry Solutions Map Display Manager 1312, Industry Solutions Map Renderer 1314 and Industry Solutions Map Parser 1316 components. An industry or service line may have multiple Industry Solutions Maps, in which case the Industry Solutions Map Manager component would manage multiple maps.

The Industry Solutions Map Display Manager 1312 component controls the display, user interface, views and details for an Industry Solutions Maps. This component uses the Industry Solutions Map Renderer 1314 component to get the rendered views for display. The Industry Solutions Map is displayed dynamically based on run-time choices made by the user. The Industry Solutions Map Renderer component obtains the parsed data from the Industry Solutions Map Parser 1316 component, and renders the industry solutions map through pre-defined or user-specified formatted views. The layout and look and feel of these views could be controlled by data received through the component call mechanism, through business rules or templates, or by any other means. The Industry Solutions Map Parser component obtains the data from the Data Manager 770 component and parses it based on the applicable business logic and business rules as specified by the Business Rules Manager 760 component.

The Model Display Manager 712, Component Business Model Display Manager 812, CBM Map Display Manager 822, Process Model Display Manager 912, Service Model Display Manager 1012, Data Model Display Manager 1122, Message Model Display Manager 1132, Business Glossary Display Manager 1142 and Industry Solutions Map Display Manager 1312 components use the Association Display Manager 852 component to display associations, linkages and relationships between different elements of a model or across models in an IBAM or across IBAMs.

The present invention detailed herein thus provides an IBAM publishing system and tool using a data-driven framework and flexible data model schema for capture and publishing of IBAMs over a network or in disconnected mode.

FIG. 14 depicts an example Industry Solutions Map. Each Industry Solutions Map is associated with an Industry or Service line, and typically contains Strategic Drivers, Industry Solutions, Solution Offerings, Frameworks, Infrastructure elements, as well as other optional elements. Each Solution Offering is associated with one or more Industry Solutions within this map.

Figure 15:
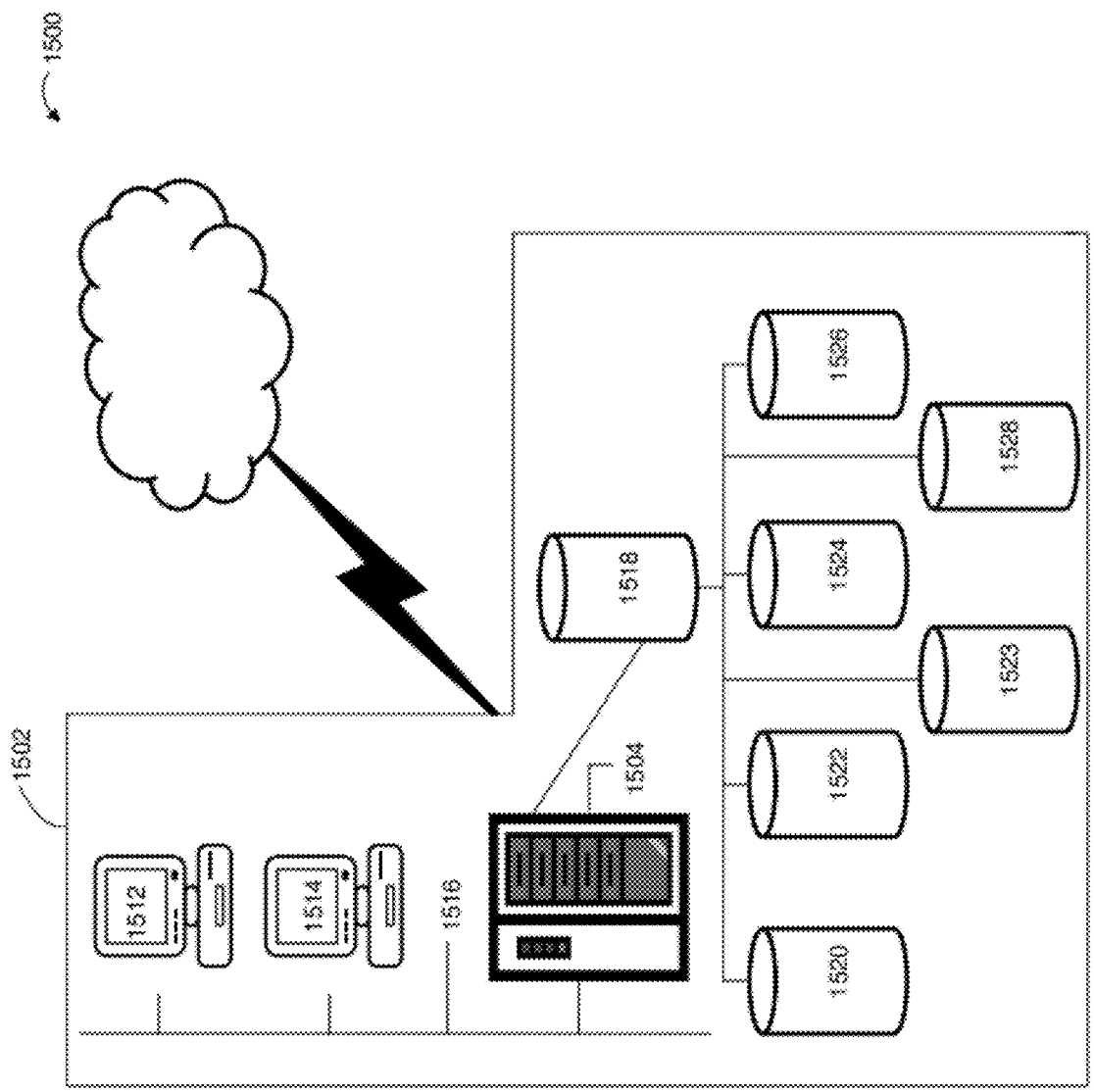
FIG. 15 is a network system for publishing a plurality of IBAMs and their constituent model elements, along with all the relationships and associations within and between IBAMs, and which makes IBAMs available for users to browse, navigate, display, and consume IBAM content easily.

In FIG. 15 there is shown a network system upon which an IBAM can be published using the system of the present invention. System 1500 of FIG. 15 includes a business enterprise 1502 having server 1504 and data storage device 1518 having databases or content repositories 1520-1528. System 1500 also has client systems 1512 and 1514 representing computer workstations, laptops, personal data assistants, cell phones, or any other client device known in the art. Those of ordinary skill in the information technology arts will recognize that client systems 1512 and 1514 may be used to access IBAMs either over a network or in disconnected mode using known networking techniques including use of web browsers or other user interfaces known in the art. System 1500 may also include a network connection to the Internet or any other network whether broadband or not, depicted by the cloud and lightning elements of FIG. 15.

Figure 16:
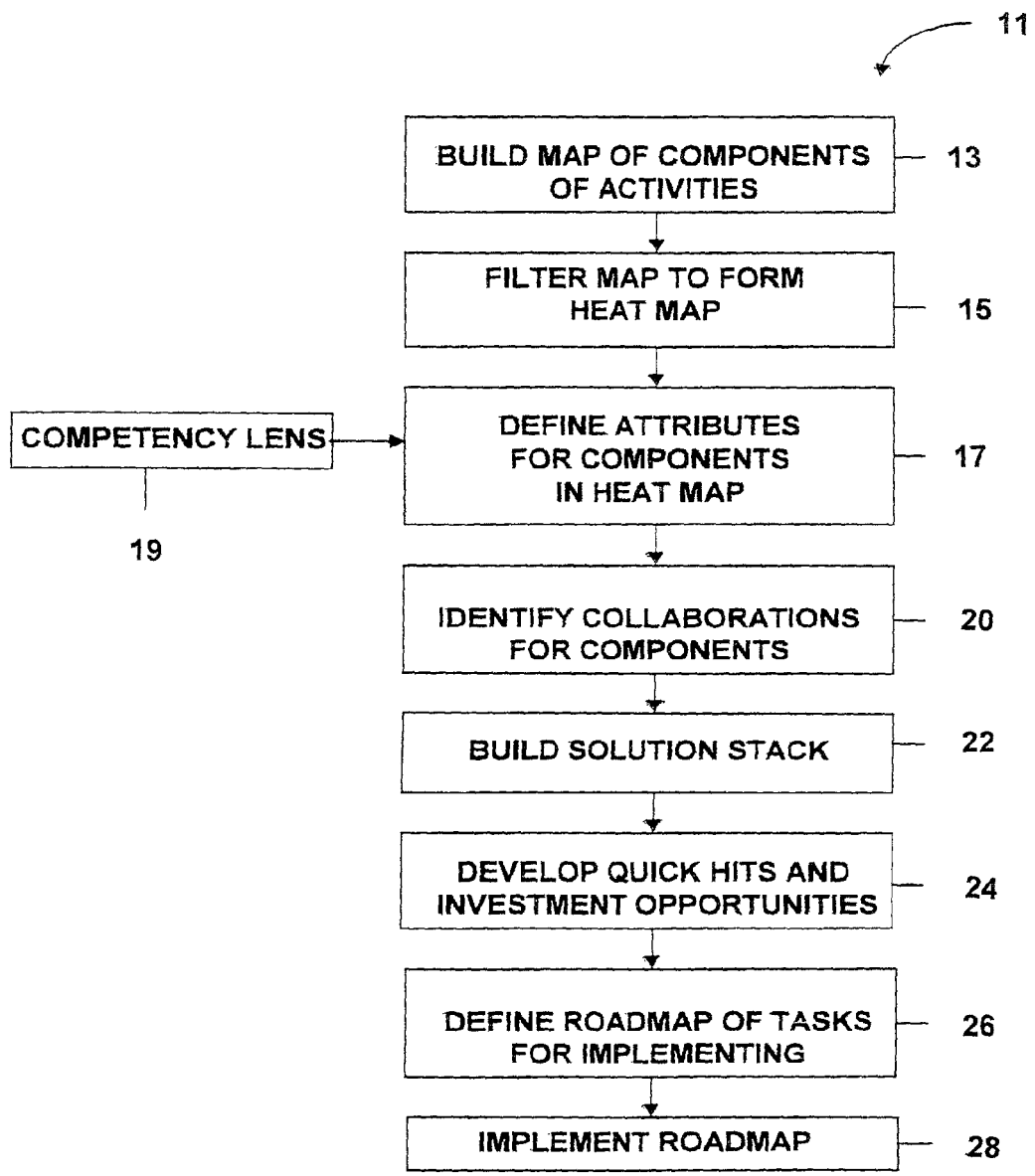
FIG. 16 is a flowchart illustrating the various steps involved in carrying out one embodiment of the present invention.

In FIG. 16 there is shown flowchart 11 depicting steps of a process for carrying out an embodiment of the present invention. In step 13 a map of components of activities is built. For a particular client business a component shall be taken to mean a group of cohesive business activities supported by appropriate processes, applications, infrastructure, and metrics. Applications may be software applications supporting a business activity. Each component is flexible. Components may work in any combination or sequence with other components to get the job done. Each component may be individually scalable and extensible.

FIG. 17 shows an example of such a map of components. The rows of matrix 30 are grouped into three management levels of business activities, namely, planning and analysis, checks and controls, and execution. The rows of the matrix are standard for all industries, defining three levels of management control. For each grouping of activities in a column, a combination of these three levels is required to ensure the business operates effectively.

The columns of matrix 30 are activity categories which will be industry specific. However, once a good component map is built for any client, it may be used for any other client or competency in that specific industry. Business activities are determined in interviews supported by subject area specialists to identify both current and future capabilities. Activities may be specified in the following general terms:

Functionality—the Subject
Users—Skill level, authority
Systems
   Analytical
   Operational Decisioning
   Automated
Operational Characteristics
Business Information Usage
or any other general terms used in the industry.

Components within the activity categories should be able to be extracted (e.g., outsourced) without disrupting the enterprise. Smart components may be defined and represent opportunities for development by the services providing company. A component map, when built, depicts the future enterprise and industry leading practices. The level of detail is appropriate for the required analysis (is retractable and expandable). Activities are performed only in one component.

The column titles in FIG. 17 represent an example of activity categories for a specific industry. Activity categories for a client company in another industry such as the insurance industry may be those shown below in Table 1.

TABLE 1

Activity Categories for Insurance Company Client

Product Development
Risk Management
Marketing
Business Acquisition and Retention
New Business Installation and Enrollment
Services
Claims
Business Administration and Finance In step 15 of FIG. 16 the component map built in step 13 is filtered to form a heat map. For each activity category in component map 30, capabilities are defined that summarize how the organization seeks to perform in that aspect of its business. Target competitive levels are then determined for each capability. For example, levels of base, competitive, or differentiated may be used. The competitive levels are then translated onto component map 30, e.g. color coding or shading of components in map 30 may be used to indicate the level.

Figure 18:
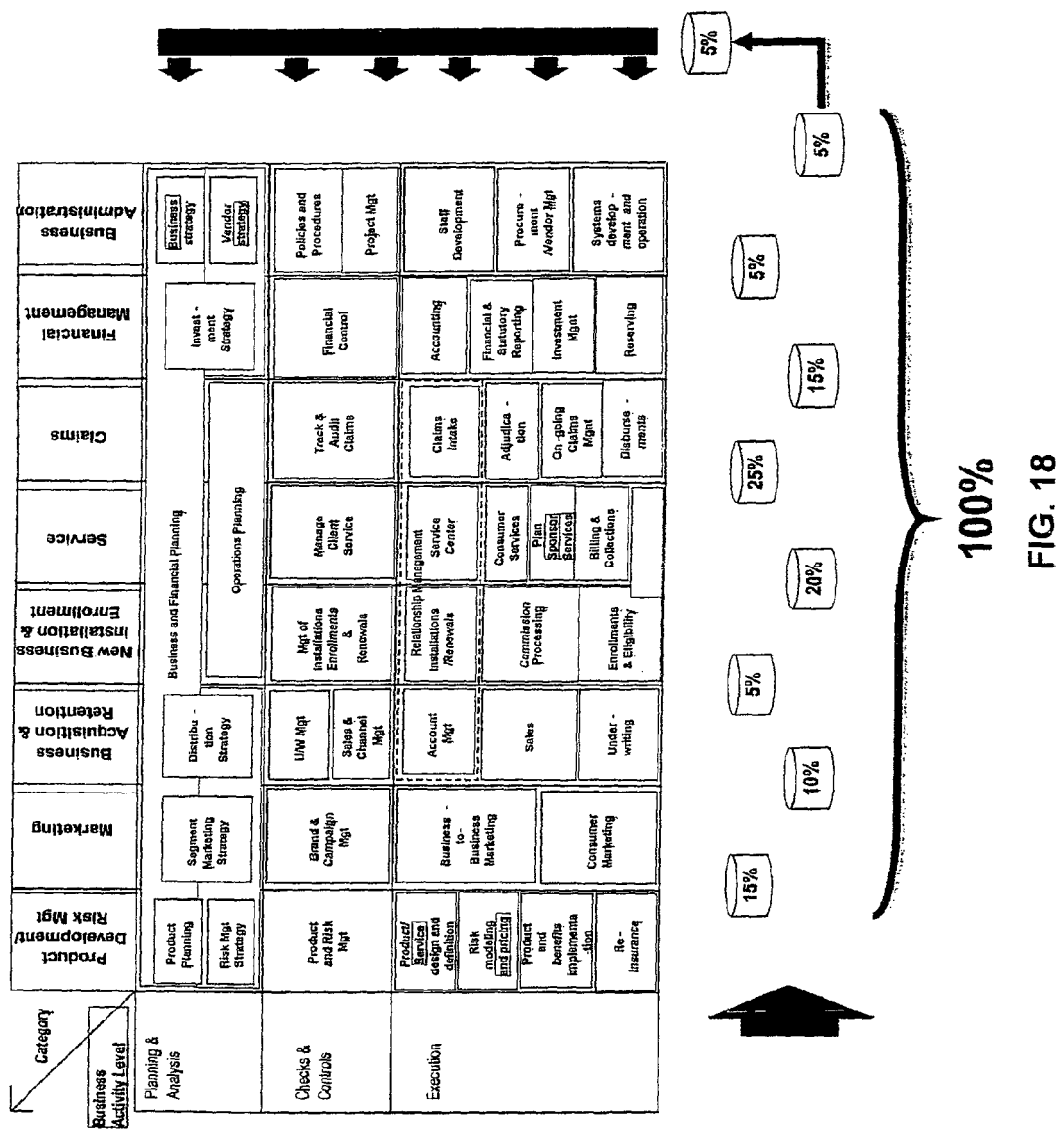
FIG. 18 shows the process of allocating revenue.

Cost filtering as shown in FIG. 18 may also be performed in step 15. For example, a cost pie of 100% may be allocated to the activity categories (columns). In FIG. 18 15% of cost is allocated to Product Development/Risk Management. The allocation may be based on cost center data. Any other basis of allocating cost may be used such as by the number of full time equivalent (FTE) people required to perform the activities involved. For each column, the allocated cost is then distributed across components in that column on another basis, for example, headcount. In FIG. 18 the 5% allocated to Business Administration is distributed across the components in the last column by headcount.

Revenue filtering may be performed using similar allocation and distribution methods.

Cost and revenue filtering may also be depicted by dollar value sorting into high, medium, and low buckets, e.g.:

|  |  |
|---|---|
| Low | <$10M |
| Medium | $10M to $70M |
| High | >$70M |

The results of cost and/or revenue filtering are also summarized on the component map such as by indicating the cost and/or revenue levels or bucket for each component.

After applying the filtering just described, components are selected to form a heat map. Selected components should be components that drive the primary strategy of the company such as low cost provider, brand, servicing, and have a large gap between the current and desired capabilities. Components that have a large potential to increase revenue or reduce cost may also be selected. Components that the client or interviews have identified as problematic may be selected. Components required to perform key functions may also be selected.

A component map having only the selected components shall be designated herein to be a heat map.

In step 17 attributes are defined for the selected components in the heat map. Attributes may be defined based on a competency lens provided in step 19. Attributes to analyze a component are based in the general service area and the specific project offering. The key functions of a component are attributed based on the current and desired industry maturity level. On-demand attributes are used when the intent of the analysis is migrating the client company toward an on-demand solution. This defining attributes step may need to be applied iteratively or repeated.

The competency lens provided in step 19 includes competency offerings such as business strategy, information technology (IT) strategy, organizational strategy, and operations strategy. For example, use of the organizational strategy competency offering in the competency lens to analyze or evaluate based on a criteria, a selected component in the heat map, may lead to defining "skills" or "roles" as an attribute for that selected component. Attributes of "processes" or "consumption" may be associated with use of the operations strategy competency offering in the competency lens of step 19. The component is then assessed based on the defined attributes and any gaps or shortfalls are noted.

In step 20 collaborations for components are identified. Patterns may be applied to candidate components. These patterns are used to model how the components might collaborate dynamically to support key business processes such as launching a product, acquiring a new customer, or detecting and responding to fraud. The patterns can be matched to the behaviors of components to identify structural process improvement opportunities as well as on-demand opportunities. Examples of patterns are listed below in table 2.

TABLE 2

| Collaborative Patterns | |
|---|---|
| Consolidator/Server | A goto point for a frequently/widely referenced function or information |
| Processor | A discrete step in a process (bounded for re-use in multiple processes) |
| Gatekeeper | Coordinating access to multiple services (to fully exploit/parallelize an event) |
| Controller | Overseeing, trouble shooting, authorizing and/or classifying/checking |
| Analyzer | Gathering management information - planning, targets, sensitivity assessment rating |

Returning now to FIG. 16, in step 22 a business component solution stack is built using the heat map, the defined attributes, and the identified collaborations. The attributes and collaborations are layered onto the components in the two dimensional heat map forming a three dimensional stack of potential solutions. The solution stack represents a framework for the desired future state vision of the client company.

Revenue levers may be applied to the component attributes by determining how fast revenue is impacted by the component. Examples of revenue levers are market penetration, franchise penetration, share of wallet, customer retention, profit margin, profit fees, profit processing overhead, and avoidable losses.

Cost levers may also be applied. Examples of cost levers include new customer acquisition, staff turnover, productivity, time to money, and asset optimization. These are determined as a dollar value per year.

The revenue and cost lever values are applied to the components and may be used in building the solution stack in step 22.

In step 24 quick hits and investment opportunities are developed from the solution stack. An assessment is performed for each attribute to determine shortfalls or gaps as compared to best industry practice. Current and desired future capacities are defined for base, competitive, and differentiated levels. A functionality analysis is performed for each component and the services it references and offers to other components.

From these analyses of the solution stack framework projects having a short development cycle and rapid benefit known as quick hits are developed. Longer term projects with significant payback known as investment opportunities are also developed. On a listing of quick hits and investment opportunities, each project may be categorized. For example, categories may be an application enhancement (AE), new application-green field (GF), application reduction (AR) and business process only (BP).

In step 26 a roadmap of tasks for implementing each project is defined. For each project, a project template may be used to fully document the critical aspects of the project. For example, the template may include project description, a high level cost/benefit analysis, risks, approach, work effort estimate, dependencies, and outputs.

In step 28 the projects are prioritized relative to each other based on the entries in the templates, creating a portfolio of opportunity. Projects designated as quick hits define the first wave of implementation. Further waves of projects are selected from the prioritized opportunity portfolio and implement in step 28.

Client systems 1512, 1514 may be operated by representatives of business enterprise 1502 including business consultants, information technology (IT) professionals, architecture specialists, business professionals, management, and system administrators. The term "business enterprise" shall be taken herein to refer to the organization operating the IBAM publishing system of the present invention.

Network 1516 connecting client systems 1512, 1514 to server 1504 may comprise a LAN, WAN, wireless, infrared, radio, or any network configuration known in the art. Business enterprise 1502 operates the IBAM publishing system and publishes IBAMs via server 1504, client systems 1512, 1514 or a combination of these.

Server 1504 has data storage 1518 attached either directly or via network 1516. Data storage has a plurality of databases or content repositories 1520-1528 included therein.

System 1500 may also include wired or wireless connection to a wide area network including multiple geographical locations interconnected by high speed data lines or radio links as depicted by the lightning and cloud elements of FIG. 15.

In an exemplary embodiment, the IBAM publishing system may be executed on server 1504, and the published IBAMs accessed using clients 1512, 1514, or on a combination of the above.

While there have been shown and described what are considered the preferred embodiments of the invention, it will be obvious to those skilled in the art that various changes and modifications may be made therein without departing from the scope of the invention as defined by the appended claims.

What is claimed is:

1. A computer-implemented method for publishing industry business architecture models (IBAMs) having a component business model, a process model, a service model an information model and knowledge assets and collateral, to a network having a client system, a server, and data storage, each of said IBAMs having a version and a corresponding maturity level, comprising the steps of:
    defining, using said client system, a plurality of sectors, each said sector having multiple industries having industry solutions, each of said industry solutions having multiple solution offerings;
    associating, using said client system, each of said IBAMs with a plurality of said industries, said industry solutions, and said multiple solution offerings to form associations of logical data entities of said IBAMs, wherein said each of said IBAMs having a component business model includes a heat map produced by having components selected by filtering according to competitive level, or cost, or revenue;
    storing said IBAMs with the respective associations in a database included in the data storage, and
    selecting data from said data storage in accordance with said associations to form an industry solution map.

2. The method of claim 1, wherein at least one of said IBAMs has a plurality of versions at differing maturity levels.

3. The method of claim 1, wherein said database includes a role-based access mechanism for viewing, navigating, publishing, or updating the content of said IBAMs.

4. The method of claim 1, further comprising the step of forming associations between said sectors, said industries, said industry solutions, said solution offerings, and said IBAMs, using a data-driven mechanism of business rules and roles to capture, depict, and publish said associations in said database.

5. The method of claim 1, wherein said IBAMs and their respective associations are captured and depicted using a data model schema.

6. The method of claim 5, further comprising the step of storing said data model schema in said database.

7. The method of claim 1, further comprising the step of storing a navigation hierarchy in said database.

8. A computer-readable, non-transitory storage medium that includes computer-executable instructions for publishing industry business architecture models (IBAMs) having a component business model, a process mode, a service model, an information model, and knowledge assets and collateral, to a network, said computer-executable instructions comprising:
    first instructions for defining a plurality of sectors, each of said plurality of sectors having multiple industries, each of said multiple industries having industry solutions, each of said industry solutions having multiple solution offerings;
    second instructions for associating each of said IBAMs with a plurality of said multiple solution offerings, said industry solutions, and said multiple solution offerings, forming associations of logical data entities in said IBAMs, wherein each of said IBAMs having a component business model includes a heat map produced by having components selected by filtering according to competitive level, or cost, or revenue,
    third instructions for storing said IBAMs in a database, and
    fourth instructions for selecting data from said database to form an industry solution map.

9. The storage medium of claim 8, wherein said IBAMs and their respective associations are captured and depicted using a data model schema.

10. The storage medium of claim 8, wherein said third instructions further include instructions for storing a navigation hierarchy in said database.

11. a method of publishing industry business architecture models (IBAMs) having a component business model, a process model, a service model an information model and knowledge assets and collateral, to a network having a client system, a server, and data storage, each of said IBAMs having a version and a corresponding maturity level, comprising the steps of:
    configuring said client system to define a plurality of sectors, each said sector having multiple industries having industry solutions, each of said industry solutions having multiple solution offerings;
    configuring said client system to associate each of said IBAMs with a plurality of said industries, said industry solutions, and said multiple solution offerings to form associations of logical data entities of said IBAMs, wherein said each of said IBAMs having a component business model includes a heat map produced by having components selected by filtering according to competitive level, or cost, or revenue is produced;
    configuring said client system for storing said IBAMs with the respective associations in a database included in the data storage; and
    configuring said client system to select data from said data storage in accordance with said associations to form an industry solution map.

* * * * *